United States Patent
Masuura et al.

(10) Patent No.: US 10,198,658 B2
(45) Date of Patent: Feb. 5, 2019

(54) IMAGE PROCESSING DEVICE, IMAGING DEVICE, IMAGE PROCESSING METHOD, AND PROGRAM

(71) Applicant: Sony Semiconductor Solutions Corporation, Kanagawa (JP)

(72) Inventors: Takeshi Masuura, Kanagawa (JP); Naoki Kuzuya, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 86 days.

(21) Appl. No.: 15/322,739

(22) PCT Filed: May 25, 2015

(86) PCT No.: PCT/JP2015/064943
§ 371 (c)(1),
(2) Date: Dec. 29, 2016

(87) PCT Pub. No.: WO2016/006336
PCT Pub. Date: Jan. 14, 2016

(65) Prior Publication Data
US 2017/0154236 A1      Jun. 1, 2017

(30) Foreign Application Priority Data

Jul. 11, 2014   (JP) ................. 2014-142821

(51) Int. Cl.
*G06K 9/46*      (2006.01)
*G06K 9/00*      (2006.01)
(Continued)

(52) U.S. Cl.
CPC ....... *G06K 9/4647* (2013.01); *G06K 9/00771* (2013.01); *G06K 9/42* (2013.01);
(Continued)

(58) Field of Classification Search
CPC .. G06K 9/4647; G06K 9/000771; G06K 9/42; G06K 9/4661; G06K 9/00744; H04N 7/183; H04N 5/57
See application file for complete search history.

(56) References Cited

U.S. PATENT DOCUMENTS

2001/0012324 A1* 8/2001 Normile ................ H04N 19/52
375/240.05
2005/0253972 A1* 11/2005 Wwitbruch ............... G06T 5/20
348/797
(Continued)

FOREIGN PATENT DOCUMENTS

JP      2000-184359 A      6/2000
JP      2001-292439 A     10/2001
(Continued)

*Primary Examiner* — Ali Bayat
(74) *Attorney, Agent, or Firm* — Wolf, Greenfield & Sacks, P.C.

(57) ABSTRACT

To accurately determine whether there is a sharp change in a frame.

Provided is an image processing device including: a histogram generating unit configured to generate a previous histogram showing a distribution of pixel values in a previous frame that is generated before a predetermined frame and a current histogram showing a distribution of pixel values in the predetermined frame; a normalizing unit configured to perform normalization to match variations of the pixel values of the previous histogram and the current histogram; and a similarity determining unit configured to acquire a degree of similarity of shapes of the previous histogram and the current histogram after the normalization and determine whether the degree of similarity is greater than a predetermined similarity determining threshold value.

13 Claims, 30 Drawing Sheets

(51) Int. Cl.
    *G06K 9/42*       (2006.01)
    *H04N 7/18*      (2006.01)

(52) U.S. Cl.
    CPC ........... *G06K 9/4661* (2013.01); *H04N 7/183* (2013.01); *G06K 2009/00738* (2013.01)

(56) References Cited

U.S. PATENT DOCUMENTS

| | | | |
|---|---|---|---|
| 2010/0080459 A1* | 4/2010 | Dai | G06T 5/009 |
| | | | 382/170 |
| 2011/0069751 A1* | 3/2011 | Budagavi | H04N 19/61 |
| | | | 375/240.02 |
| 2011/0115980 A1* | 5/2011 | Shmueli | H04N 5/57 |
| | | | 348/607 |
| 2012/0155764 A1 | 6/2012 | Ogura | |

FOREIGN PATENT DOCUMENTS

| | | |
|---|---|---|
| JP | 2003-219404 A | 7/2003 |
| JP | 2011-215695 A | 10/2011 |
| JP | 2012-128621 A | 7/2012 |

* cited by examiner

FIG. 5
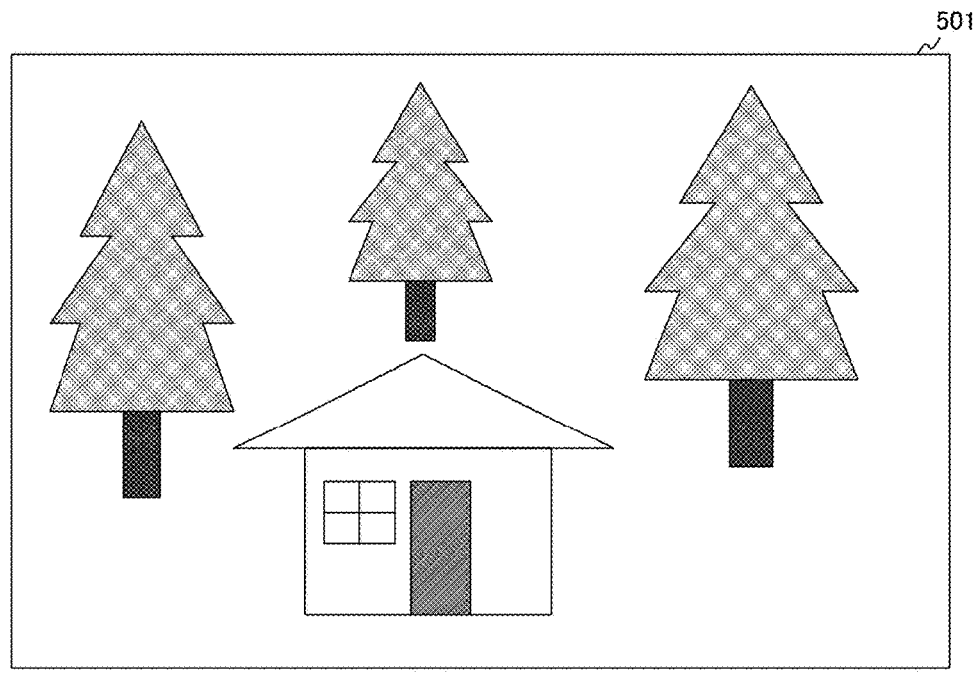
a
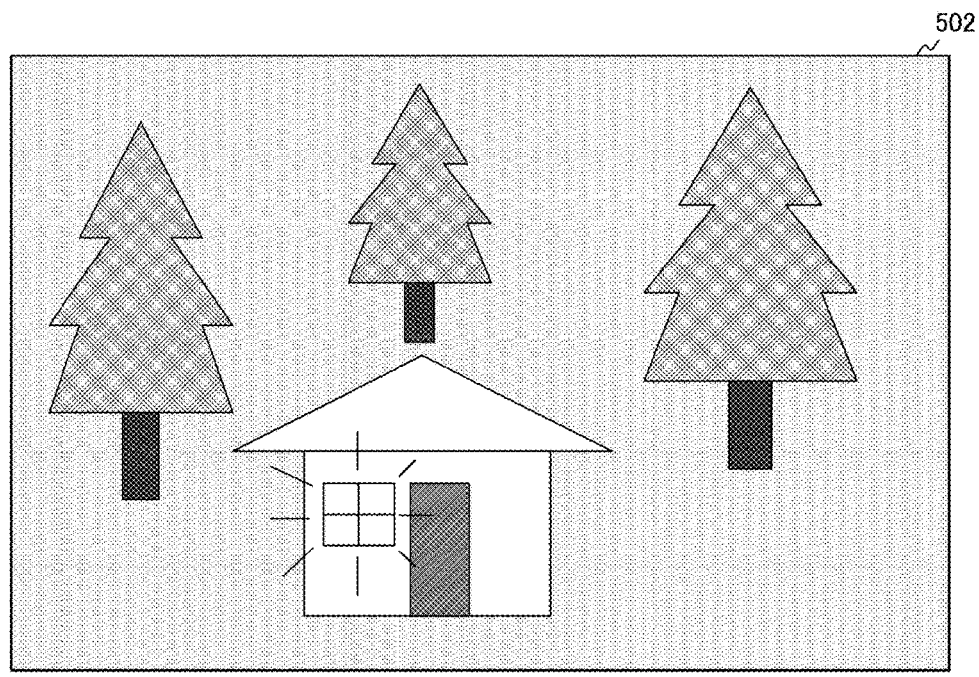
b

FIG. 6
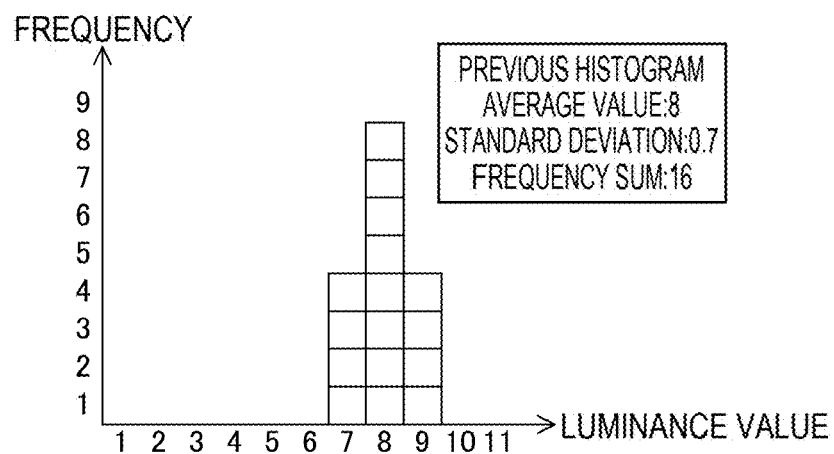
a
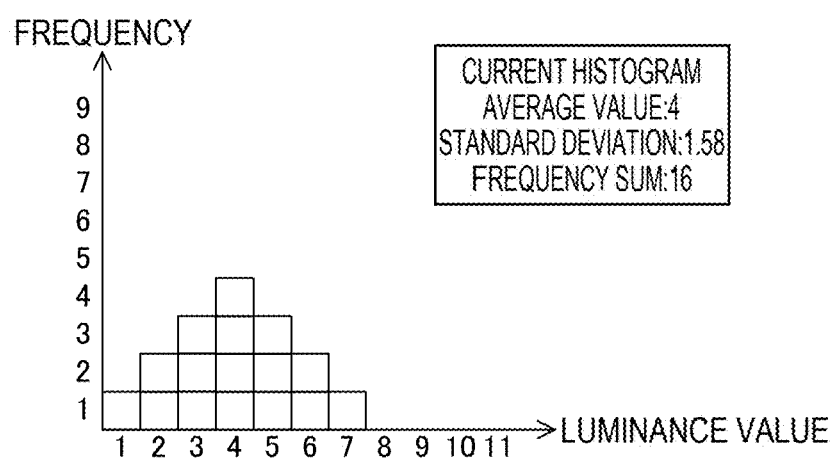
b

FIG. 7
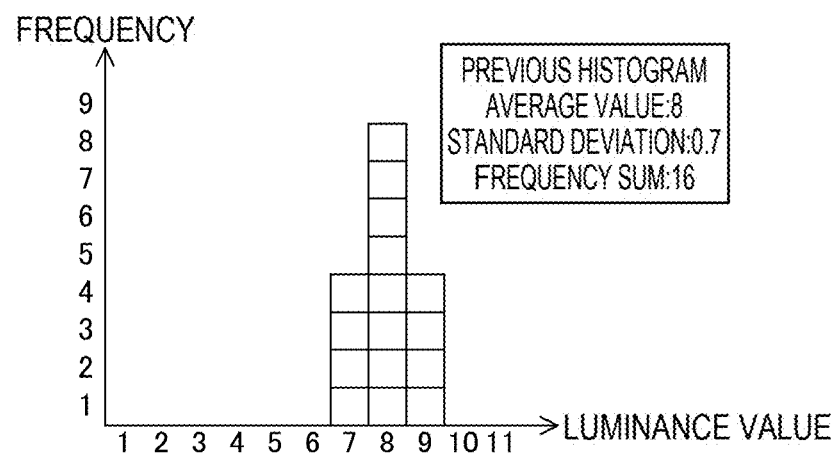
a
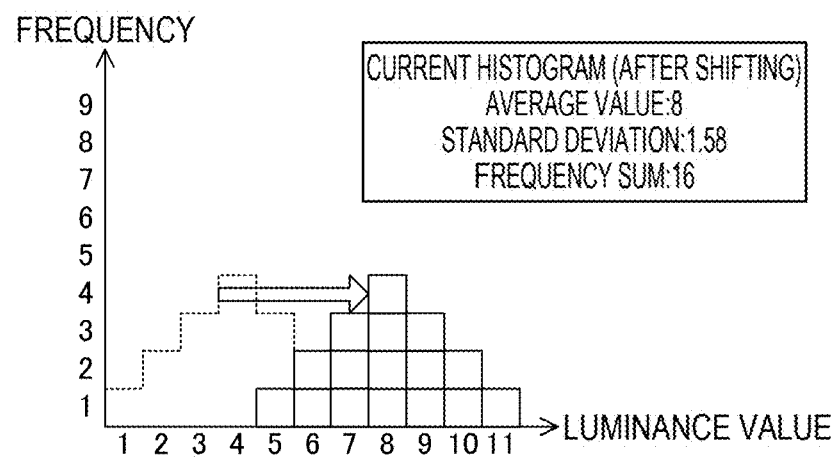
b

FIG. 8
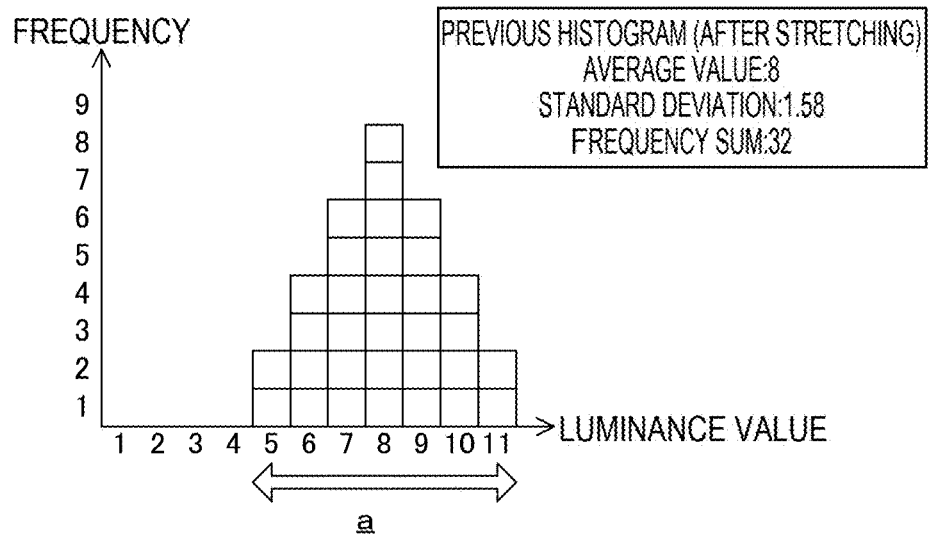
a
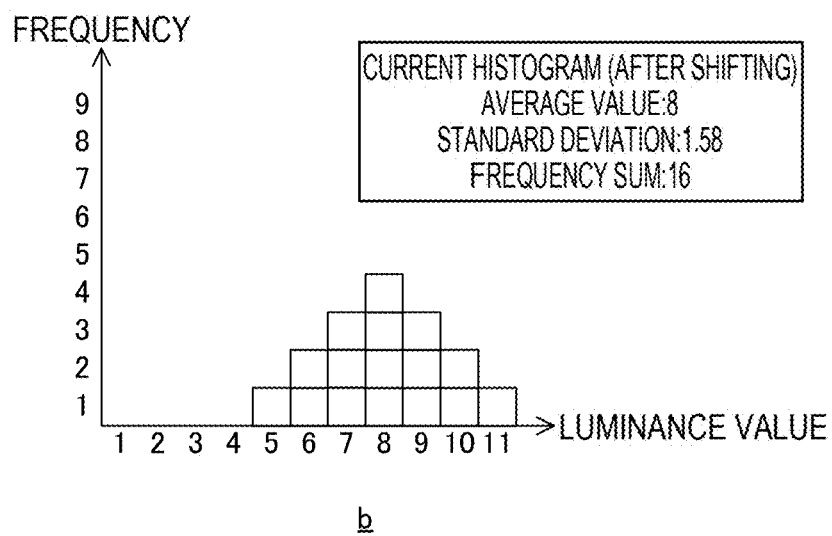
b

FIG. 9
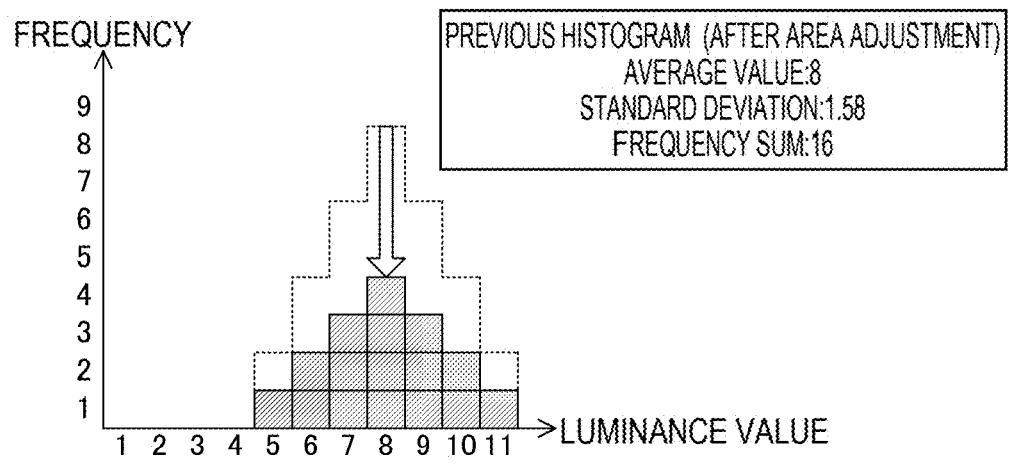
a
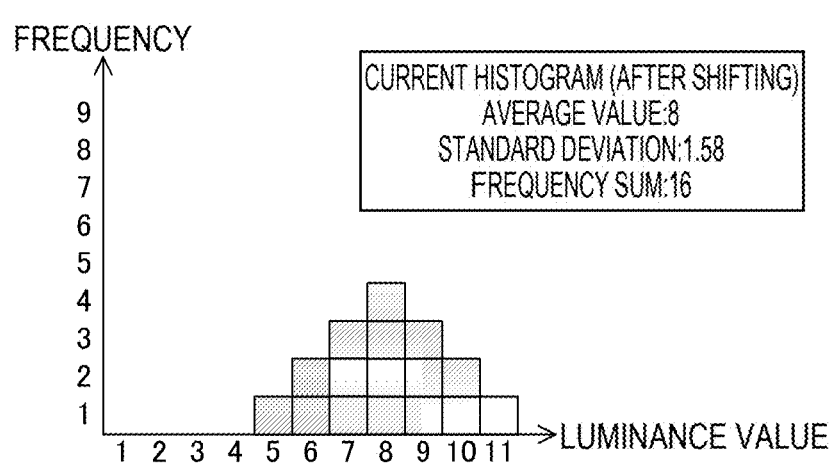
b

FIG. 10
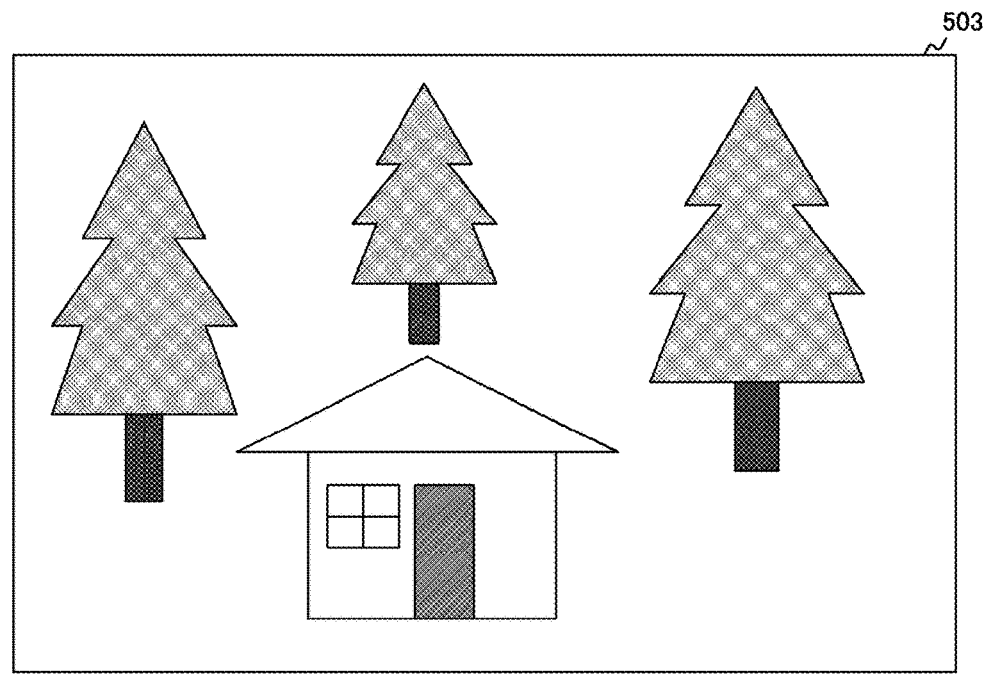
a
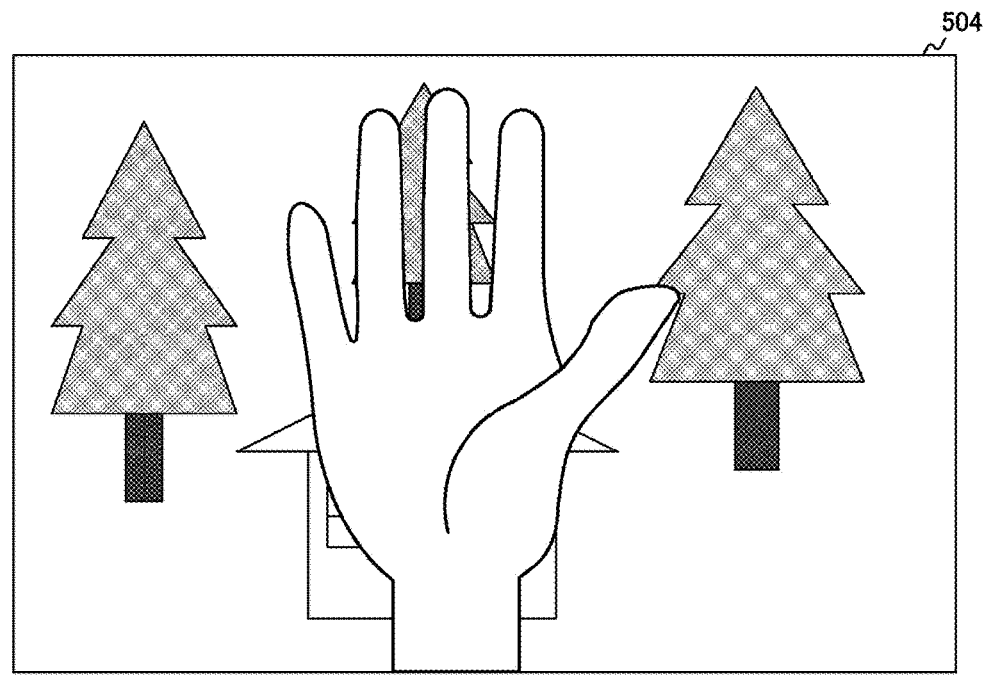
b

FIG. 11
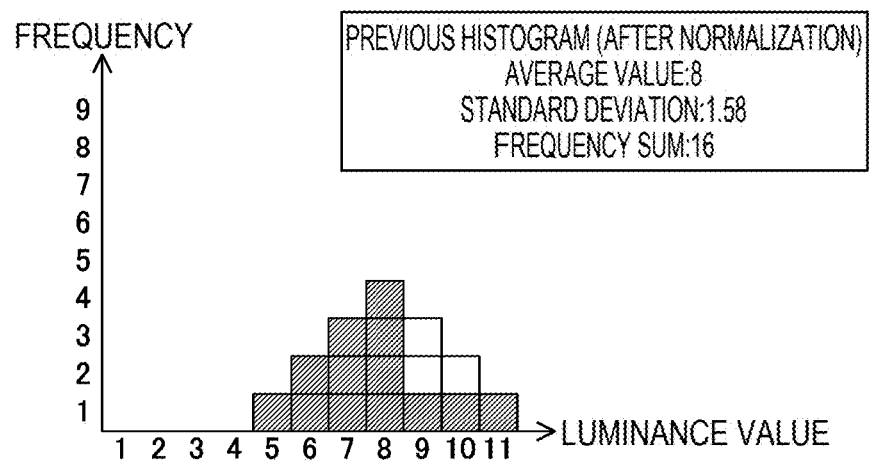
a
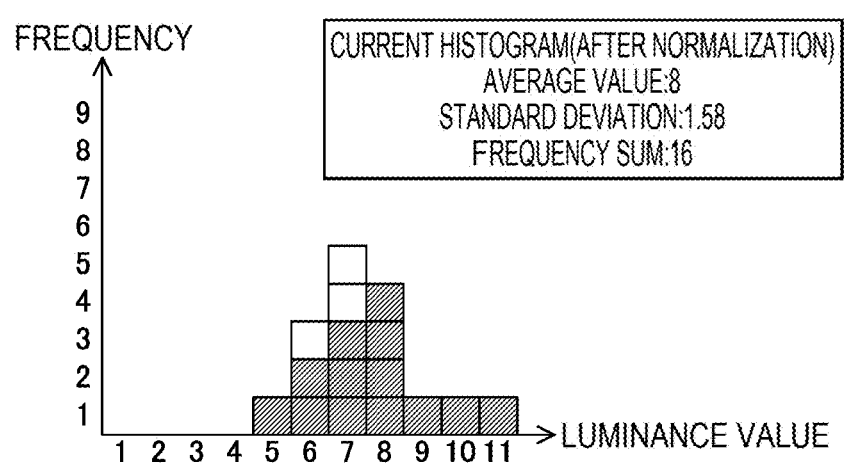
b

276

| SKEWNESS DIFFERENCE | SIMILARITY DETERMINING THRESHOLD VALUE |
|---|---|
| SKEWNESS DIFFERENCE > SKEWNESS DIFFERENCE THRESHOLD VALUE | Th1 (>Th2) |
| SKEWNESS DIFFERENCE ≤ SKEWNESS DIFFERENCE THRESHOLD VALUE | Th2 |

FIG. 18
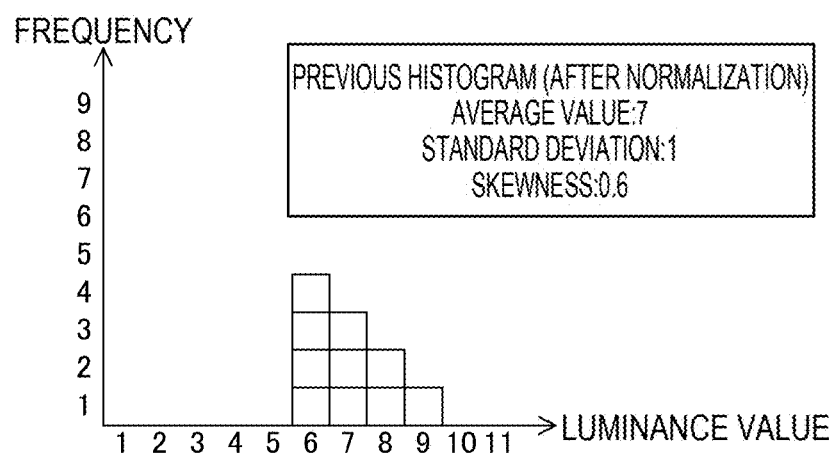
a
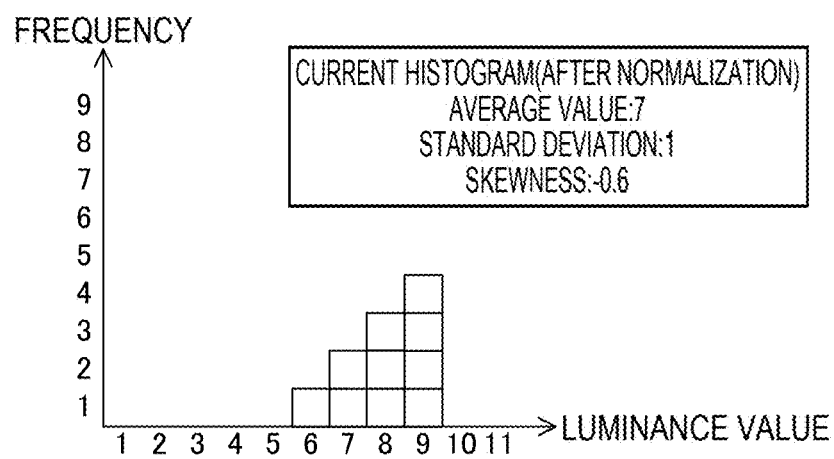
b

FIG. 22
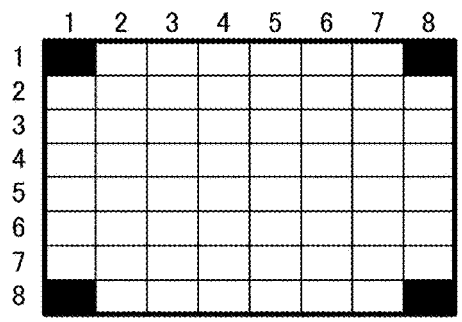
a
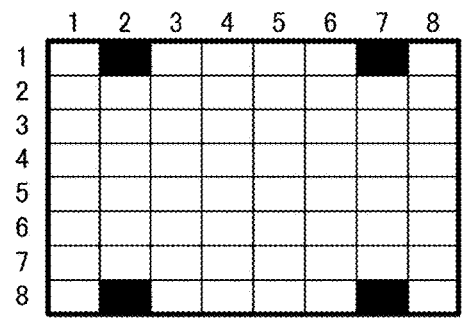
b
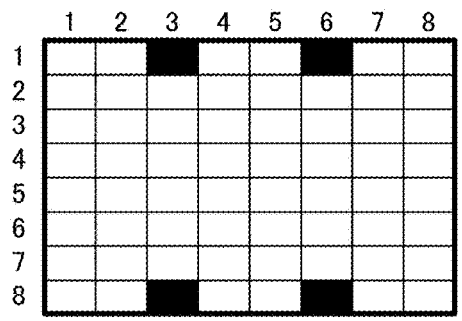
c
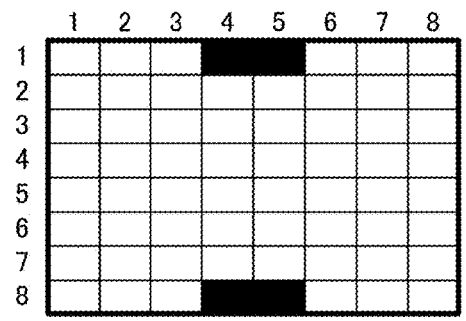
d
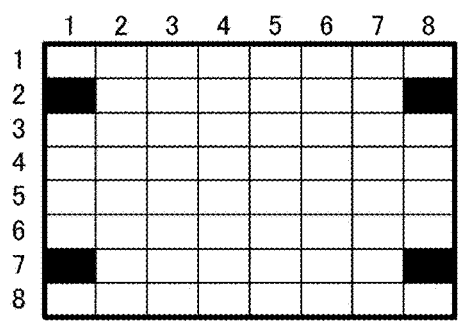
e

IMAGE PROCESSING DEVICE, IMAGING DEVICE, IMAGE PROCESSING METHOD, AND PROGRAM

CROSS-REFERENCE TO RELATED APPLICATIONS

This application is a National Stage of International Application No. PCT/JP2015/064943, filed in the Japanese Patent Office as a Receiving office on May 25, 2015, which claims priority to Japanese Patent Application Number 2014-142821, filed in the Japanese Patent Office on Jul. 11, 2014, each of which is hereby incorporated by reference in its entirety.

TECHNICAL FIELD

The present technology relates to an image processing device, an imaging device, an image processing method, and a program and specifically, to an image processing device and an imaging device that are configured to determine whether an interruption has occurred, a processing method thereof, and a program causing a computer to execute the method.

BACKGROUND ART

In recent years, a monitoring system configured to capture an image of a predetermined location using a surveillance camera, perform image processing of the captured image (a frame), and detect a moving body such as a human or an animal has been widely used in the field of security. In the monitoring system, an interruption has occurred such as an action of changing a direction of the surveillance camera and an action of covering an imaging lens with a cloth or a hand. When there is such an interruption, the surveillance camera is unable to continue normal monitoring. Therefore, a surveillance camera that determines whether an interruption has occurred and produces an alarm when an interruption has occurred has been proposed (for example, refer to Patent Literature 1).

The above-described surveillance camera generates a histogram showing a distribution of pixel values of a current frame and a previous frame, and performs normalization to match average values with such histograms. Therefore, the surveillance camera obtains a degree of similarity of shapes of a normalized histogram of the current frame and a normalized histogram of the previous frame, and detects whether an interruption has occurred based on a comparison result of the degree of similarity and a threshold value. The surveillance camera performs normalization to match average values to prevent a change in brightness from being erroneously determined as an interruption.

CITATION LIST

Patent Literature

Patent Literature 1 JP 2012-128621A

SUMMARY OF INVENTION

Technical Problem

While normalization is performed assuming that a shape of a histogram is hardly changed according to a change in brightness in the above-described surveillance camera, a shape of a histogram is actually slightly changed according to a change in brightness. Therefore, in the above-described surveillance camera, there is a risk of a change in brightness being erroneously determined as an interruption. Accordingly, there is a problem in that it is not possible to accurately determine whether there is a sharp change in a frame due to an interruption.

The present technology has been made in view of the above-described circumstances and is provided to accurately determine whether there is a sharp change in a frame.

Solution to Problem

The present technology has been made in order to solve the above problem. A first aspect of the present technology is an image processing device including: a histogram generating unit configured to generate a previous histogram showing a distribution of pixel values in a previous frame that is generated before a predetermined frame and a current histogram showing a distribution of pixel values in the predetermined frame; a normalizing unit configured to perform normalization to match variations of the pixel values of the previous histogram and the current histogram; and a similarity determining unit configured to acquire a degree of similarity of shapes of the previous histogram and the current histogram after the normalization and determine whether the degree of similarity is greater than a predetermined similarity determining threshold value, and an image processing method and a program causing a computer to execute the method. Accordingly, there is provided an operation in which it is determined whether a degree of similarity of shapes of the previous histogram and current histogram after normalization for matching degrees of variation of pixel values is greater than the predetermined similarity determining threshold value.

In the first aspect, the similarity determining unit may include a similarity degree acquiring unit configured to acquire the degree of similarity from the previous histogram and the current histogram after the normalization, a moment difference calculating unit configured to obtain 3rd- or higher-order moments of the previous histogram and the current histogram after the normalization and calculate a difference between the moments as a moment difference, a similarity determining threshold value setting unit configured to set a value according to the moment difference as the similarity determining threshold value, and a comparing unit configured to compare the acquired degree of similarity with the set similarity determining threshold value and determine whether the degree of similarity is greater than the predetermined similarity determining threshold value. Accordingly, there is provided an operation in which the similarity determining threshold value set according to the moment difference is compared to the degree of similarity.

In the first aspect, the moment may include skewness. Accordingly, there is provided an operation in which the similarity determining threshold value set according to a difference of the skewness is compared to the degree of similarity.

In the first aspect, the moment may include kurtosis. Accordingly, there is provided an operation in which the similarity determining threshold value set according to a difference of the kurtosis is compared to the degree of similarity.

In the first aspect, the previous frame and the current frame may each include a plurality of blocks, and the histogram generating unit may generate a histogram of a predetermined number of blocks among the plurality of blocks within the previous frame as the previous histogram and generate a histogram of the predetermined number of blocks among the plurality of blocks within the predetermined frame as the current histogram. Accordingly, there is provided an operation in which a histogram of the predetermined number of blocks within the frame is generated.

In the first aspect, a normalization determining unit configured to determine whether the normalization is to be performed based on a difference between a statistic of the pixel values of the predetermined number of blocks within the previous frame and a statistic of the pixel values of the predetermined number of blocks within the predetermined frame may be further included. The normalizing unit may perform the normalization when it is determined that the normalization is to be performed. Accordingly, there is provided an operation in which whether normalization is to be performed is determined based on a difference of the statistic.

In the first aspect, an interruption determining unit configured to determine whether any of the number of times that it is determined that the degree of similarity is greater than the predetermined similarity determining threshold value within a constant cycle and the number of times that it is determined that the degree of similarity is not greater than the predetermined similarity determining threshold value within the constant cycle is greater than a predetermined interruption determining threshold value may be further included. The similarity determining unit may determine whether the degree of similarity is greater than the predetermined similarity determining threshold value a plurality of times within the constant cycle. Accordingly, there is provided an operation in which it is determined whether any of the number of times that it is determined that the degree of similarity is greater than the predetermined similarity determining threshold value within a constant cycle and the number of times that it is determined that the degree of similarity is not greater than the predetermined similarity determining threshold value within the constant cycle is greater than a predetermined interruption determining threshold value.

In the first aspect, the normalizing unit may perform the normalization by a stretching process in which a width of one of the previous histogram and the current histogram is extended or contracted according to a ratio of degrees of the variation of the previous histogram and the current histogram. Accordingly, there is provided an operation in which a width of one of the previous histogram and the current histogram is extended or contracted according to a ratio of the degrees of variation.

In the first aspect, the normalizing unit may perform normalization to match degrees of the variation and averages of the pixel values of the previous histogram and the current histogram. Accordingly, there is provided an operation in which normalization is performed to match the degrees of variation and the average values.

In the first aspect, a compression rate setting unit configured to set a different compression rate for when it is determined that the degree of similarity is greater than the predetermined similarity determining threshold value and when it is determined that the degree of similarity is not greater than the predetermined similarity determining threshold value; and a compressing unit configured to compress the previous frame and the current frame according to the set compression rate may be further included. Accordingly, there is provided an operation in which a frame is compressed at a different compression rate for when it is determined that the degree of similarity is greater than the predetermined similarity determining threshold value and when it is determined that the degree of similarity is not greater than the predetermined similarity determining threshold value.

A second aspect of the present technology is an imaging device including: an imaging unit configured to sequentially image a plurality of frames; a histogram generating unit configured to generate a previous histogram showing a distribution of pixel values in a previous frame that is imaged before a predetermined frame among the plurality of frames and a current histogram showing a distribution of pixel values in the predetermined frame; a normalizing unit configured to perform normalization to match variations of the pixel values of the previous histogram and the current histogram; and a similarity determining unit configured to acquire a degree of similarity of shapes of the previous histogram and the current histogram after the normalization and determine whether the degree of similarity is greater than a predetermined similarity determining threshold value. Accordingly, there is provided an operation in which it is determined whether a degree of similarity of shapes of the previous histogram and the current histogram after normalization for matching degrees of variation of pixel values is greater than the predetermined similarity determining threshold value.

Advantageous Effects of Invention

According to the present technology, an excellent effect which enables an accurate determination of whether there is a sharp change in a frame is obtained. Note that effects described herein are not necessarily limiting, and any effect described in the present disclosure may be achieved.

BRIEF DESCRIPTION OF DRAWINGS

FIG. 5 shows diagrams illustrating examples of a previous frame and a current frame when illumination is changed in the first embodiment.

FIG. 6 shows diagrams illustrating examples of histograms before normalization when illumination is changed in the first embodiment.

FIG. 7 shows diagrams illustrating examples of histograms after shifting when illumination is changed in the first embodiment.

FIG. 8 shows diagrams illustrating examples of histograms after stretching when illumination is changed in the first embodiment.

FIG. 9 shows diagrams illustrating examples of histograms after normalization when illumination is changed in the first embodiment.

FIG. 10 shows diagrams illustrating examples of a previous frame and a current frame when an interruption has occurred in the first embodiment.

FIG. 11 shows diagrams illustrating examples of histograms after normalization when an interruption has occurred in the first embodiment.

FIG. 18 shows diagrams illustrating examples of histograms after normalization when an interruption has occurred in the second embodiment.

FIG. 22 shows diagrams illustrating examples of a block selection order in the third embodiment.

DESCRIPTION OF EMBODIMENT(S)

Hereinafter, forms (hereinafter referred to as "embodiments") for implementing the present technology will be described. The description will proceed in the following order.

1. First embodiment (example in which degree of variation is normalized)
2. Second embodiment (example in which degree of variation is normalized and similarity determining threshold value is set)
3. Third embodiment (example in which degree of variation of part in frame is normalized)
4. Fourth embodiment (example in which degree of variation is normalized as necessary)
5. Fifth embodiment (example in which degree of variation is normalized and moving image is compressed)

1. First Embodiment

[Configuration Example of Imaging Device]

Figure 1:
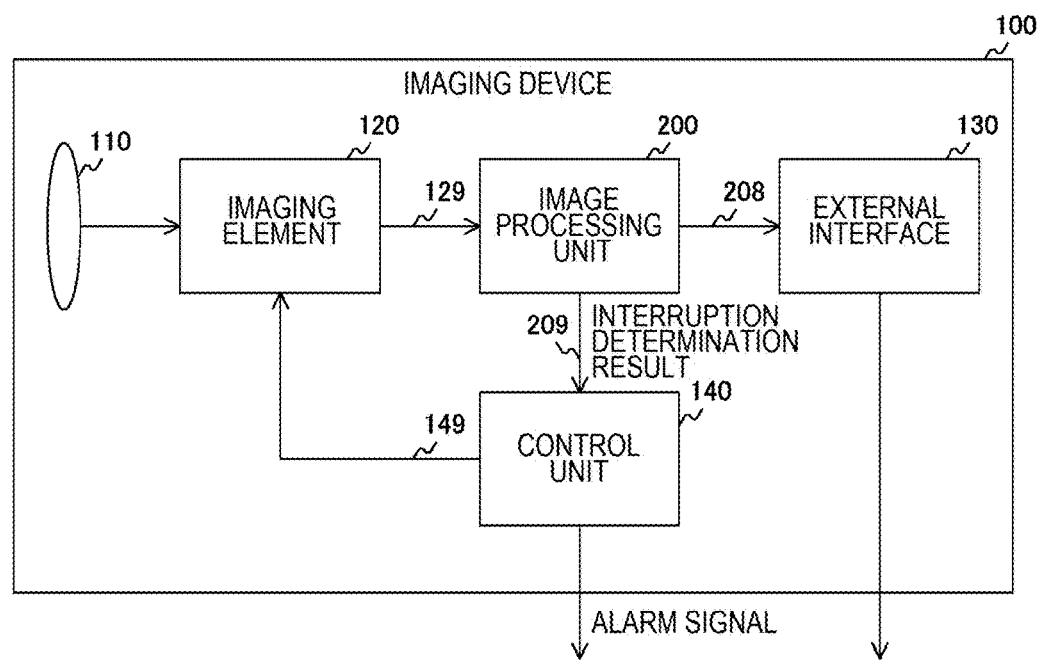
FIG. 1 is a block diagram illustrating a configuration example of an imaging device in a first embodiment.

FIG. 1 is a block diagram illustrating a configuration example of an imaging device 100 in a first embodiment of the present technology. The imaging device 100 includes an imaging lens 110, an imaging element 120, an image processing unit 200, an external interface 130 and a control unit 140.

The imaging lens 110 collects light and guides the light to the imaging element 120. The imaging element 120 converts the light from the imaging lens 110 into an electrical signal and images a frame under control of the control unit 140. The imaging element 120 supplies the imaged frame to the image processing unit 200 through a signal line 129. The imaging element 120 is an example of an imaging unit described in the appended claims.

The image processing unit 200 performs predetermined image processing of a frame. For example, demosaic processing, white balance processing, and gamma correction processing are performed as the image processing. The image-processed frame is supplied to the external interface 130 through a signal line 208. In addition, the image processing unit 200 determines whether an interruption has occurred from a plurality of frames and supplies the determination result to the control unit 140 through a signal line 209 as an interruption determination result. The external interface 130 transmits the image-processed frame to the external device.

The control unit 140 controls the entire imaging device 100. For example, when a predetermined manipulation for starting imaging is performed, the control unit 140 causes the imaging element 120 to start imaging a moving image including a plurality of frames in chronological order. In addition, the control unit 140 receives the interruption determination result from the image processing unit 200, and outputs a predetermined alarm signal for notifying that an interruption has occurred using sound or light to the outside when the interruption has occurred.

While the imaging device 100 outputs a frame from the external interface 130, the frame may be displayed on a display unit or may be recorded in a recording unit. In addition, the imaging lens 110, the imaging element 120, the image processing unit 200, the external interface 130 and the control unit 140 are provided in one imaging device 100, but they may be provided in separate devices in a distributed manner. For example, the imaging lens 110, the imaging element 120, the external interface 130 and the control unit 140 are provided in the imaging device 100, and the image processing unit 200 may be provided in an image processing device.

[Configuration Example of Image Processing Unit]

Figure 2:
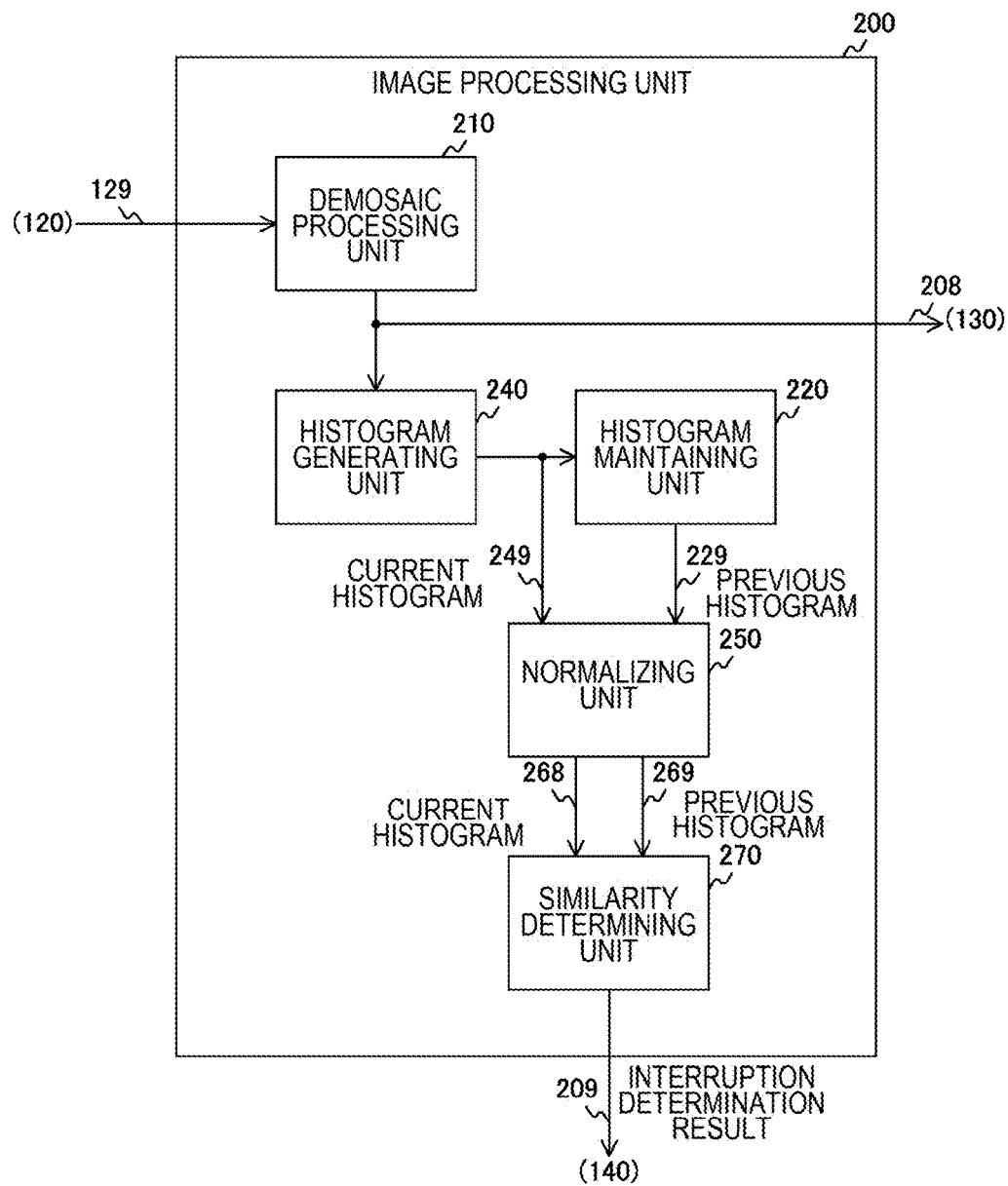
FIG. 2 is a block diagram illustrating a configuration example of an image processing unit in the first embodiment.

FIG. 2 is a block diagram illustrating a configuration example of the image processing unit 200 in the first embodiment. The image processing unit 200 includes a demosaic processing unit 210, a histogram maintaining unit 220, a histogram generating unit 240, a normalizing unit 250 and a similarity determining unit 270.

The demosaic processing unit 210 performs demosaic processing of a frame. The demosaic processing unit 210 supplies the demosaicked frame to the histogram generating unit 240 and the external interface 130.

The histogram generating unit 240 generates a histogram showing a distribution of pixel values (for example, luminance values) of a frame. For example, a frequency distribution chart or a columnar graph is generated as a histogram in which the number of pixels having each pixel value is represented as a frequency for each pixel value. The histogram generating unit 240 receives a frame from the demosaic processing unit 210 and generates a histogram from the frame. The histogram generating unit 240 supplies the generated histogram to the normalizing unit 250 and the histogram maintaining unit 220 through a signal line 249. The histogram maintaining unit 220 maintains N histograms. Here, N is an integer of 1 or more.

The normalizing unit 250 performs normalization of a histogram. The normalizing unit 250 acquires a histogram from the histogram generating unit 240 as a current histogram and acquires a histogram N frames before the current histogram from the histogram maintaining unit 220 as a previous histogram. Thus, the normalizing unit 250 performs normalization to match degrees of variation and averages of pixel values of the previous histogram and the current histogram. For example, the normalizing unit 250 matches a degree of variation and an average of pixel values of one of the previous histogram and the current histogram with those of the other. The normalizing unit 250 may match a degree of variation and an average of pixel values of both of the previous histogram and the current histogram with a set reference value. As the degree of variation, for example, a standard deviation is normalized. The normalizing unit 250 supplies the previous histogram and the current histogram after normalization to the similarity determining unit 270 through signal lines 268 and 269.

While the normalizing unit normalizes a standard deviation as a degree of variation, a statistic other than the standard deviation may be normalized as long as it indicates a degree of variation. For example, the normalizing unit 250 may normalize a distribution instead of the standard deviation.

The similarity determining unit 270 obtains a degree of similarity of shapes of the previous histogram and the current histogram after normalization and determines whether the degree of similarity is greater than a predetermined similarity determining threshold value. For example, as a degree of similarity is higher, a higher value is calculated as the degree of similarity. In this case, when it is determined that a degree of similarity is greater than the similarity determining threshold value, the similarity determining unit 270 generates an interruption determination result indicating that no interruption has occurred, and otherwise, generates an interruption determination result indicating that an interruption has occurred. Then, the similarity determining unit 270 supplies the generated interruption determination result to the control unit 140.

The image processing unit 200 may further perform various types of processing such as white balance processing and gamma correction processing in addition to the demosaic processing. In addition, while the image processing unit normalizes a frame after demosaicking, it may normalize a frame before demosaicking.

In addition, while the image processing unit 200 generates a histogram of one previous frame N frames before, it may generate one histogram for each of a plurality of previous frames. For example, the image processing unit 200 may generate a previous histogram 2×N frames before and a previous histogram N frames before. In this case, a logical product or a logical sum between a similarity determination result of the previous histogram 2×N frames before and the current histogram and a similarity determination result of the previous histogram N frames before and the current histogram is generated as a final determination result. In addition, a weighted addition of a degree of similarity of the previous histogram 2×N frames before and the current histogram and a degree of similarity of the previous histogram N frames before and the current histogram is performed. The added value is compared with the similarity determining threshold value. Even when a histogram of three or more previous frames is generated, a logic operation and a weighted addition are performed similarly.

[Configuration Example of Normalizing Unit]

Figure 3:
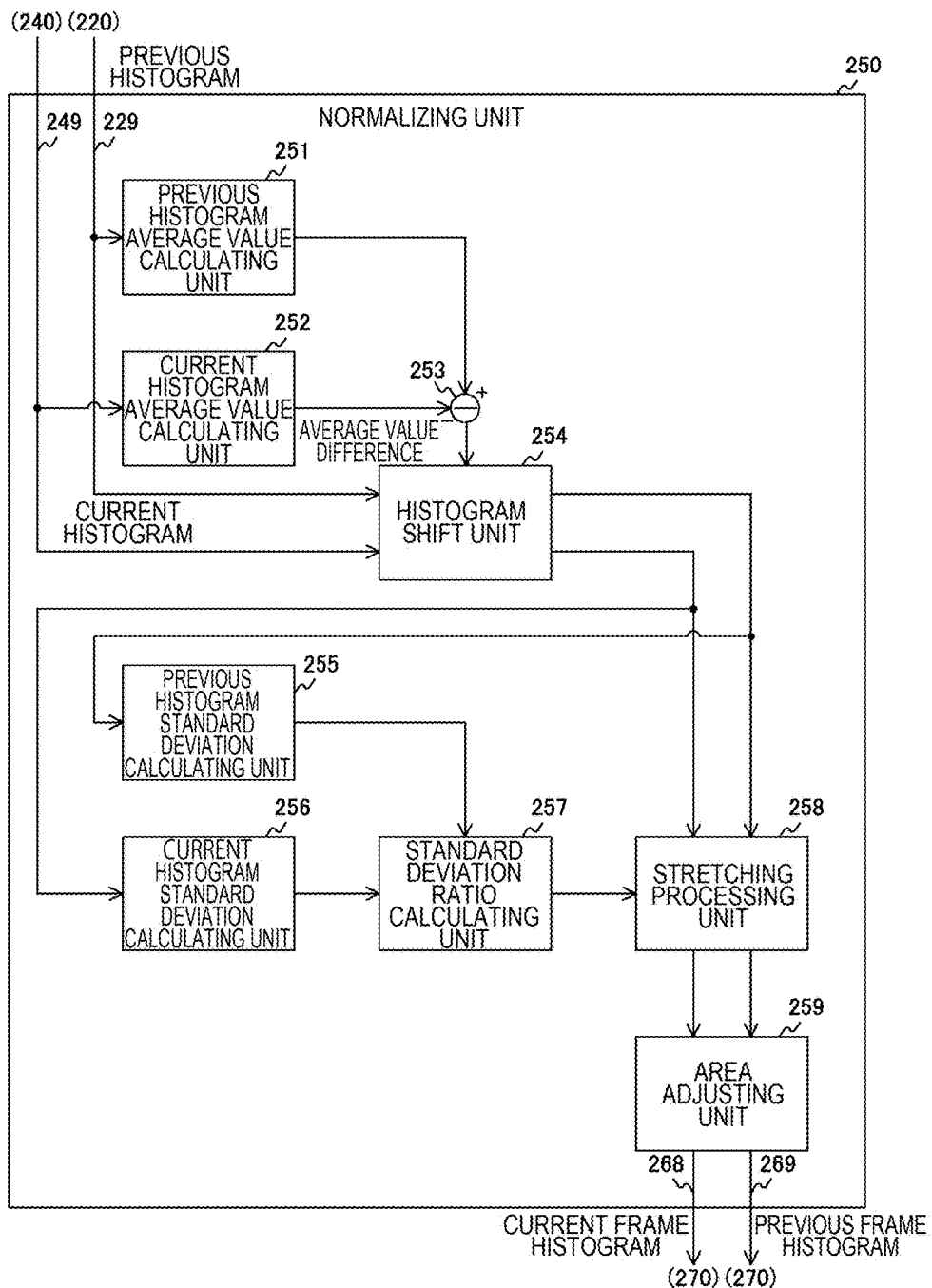
FIG. 3 is a block diagram illustrating a configuration example of a normalizing unit in the first embodiment.

FIG. 3 is a block diagram illustrating a configuration example of the normalizing unit 250 in the first embodiment. The normalizing unit 250 includes a previous histogram average value calculating unit 251, a current histogram average value calculating unit 252, a subtractor 253, and a histogram shift unit 254. In addition, the normalizing unit 250 includes a previous histogram standard deviation calculating unit 255, a current histogram standard deviation calculating unit 256, a standard deviation ratio calculating unit 257, a stretching processing unit 258 and an area adjusting unit 259.

The previous histogram average value calculating unit 251 calculates an average value of pixel values in the previous histogram. The average value is calculated by, for example, the following formula. The previous histogram average value calculating unit 251 supplies the calculated average value to the subtractor 253.

[Math. 1]

$$u = \frac{1}{n} \cdot \sum_{a=0}^{i} (f_a \times x_a) \qquad \text{Formula 1}$$

In the above formula, u denotes an average value and i denotes the number of elements in the horizontal axis of a histogram. In addition, $f_a$ denotes a luminance value and $x_a$ denotes the number of pixels (that is, a frequency) of the luminance value $f_a$. n denotes a sum of frequencies.

The current histogram average value calculating unit 252 calculates an average value of pixel values in a current histogram using Formula 1. The current histogram average value calculating unit 252 supplies the calculated average value to the subtractor 253.

The subtractor 253 subtracts the average value of one of the previous histogram and the current histogram from the average value of the other thereof. For example, the average value of the current histogram is subtracted from the average value of the previous histogram. The subtractor 253 supplies the subtraction result to the histogram shift unit 254 as an average value difference.

The histogram shift unit 254 shifts one of the previous histogram and the current histogram based on the average value difference and normalizes the average value. Here, when the histogram is described as "shifted," it means that a process, in which an amount of shift is set as S (S is an integer) and a frequency of a luminance value (x+S) is replaced with a frequency of a luminance value x, is sequentially performed for all luminance values in the histogram. However, when an absolute value of the average value difference is equal to or lower than a predetermined average difference threshold value, the histogram shift unit 254 does not shift any of the histograms.

Here, in the shift of the histogram, the histogram shift unit 254 may perform shifting such that a histogram having a low average value is matched with a histogram having a high average value or the histogram having a low average value is matched with the histogram having a high average value. For example, when the average value difference obtained by subtracting the average value of the previous histogram from the average value of the current histogram is "4," the current histogram is shifted only by an amount of shift of +4.

The histogram shift unit 254 supplies the shifted previous histogram and current histogram to the previous histogram standard deviation calculating unit 255, the current histogram standard deviation calculating unit 256 and the stretching processing unit 258.

The previous histogram standard deviation calculating unit 255 calculates a standard deviation of pixel values in the previous histogram from the histogram shift unit 254. The standard deviation is calculated by, for example, the following formula. The previous histogram standard deviation calculating unit 255 supplies the calculated standard deviation to the standard deviation ratio calculating unit 257.

[Math. 2]

$$s = \sqrt{\frac{\sum_{a=0}^{i}\{(f_a - u)^2 \times x_a\}}{n}}$$  Formula 2

In the above formula, s denotes a standard deviation of a histogram.

The current histogram standard deviation calculating unit 256 calculates a standard deviation of pixel values using Formula 2 in the current histogram from the histogram shift unit 254. The current histogram standard deviation calculating unit 256 supplies the calculated standard deviation to the standard deviation ratio calculating unit 257.

The standard deviation ratio calculating unit 257 calculates a ratio of the standard deviation of one of the previous histogram and the current histogram with respect to the standard deviation of the other thereof as a standard deviation ratio. For example, a value obtained by dividing the standard deviation of the current histogram by the standard deviation of the previous histogram is calculated as the standard deviation ratio. The standard deviation ratio calculating unit 257 supplies the calculated standard deviation ratio to the stretching processing unit 258.

The stretching processing unit 258 extends or contracts (in other words, stretches) a width of one of the previous histogram and the current histogram at a ratio according to the standard deviation ratio and thus normalizes the standard deviation in the current histogram and the previous histogram. However, when the standard deviation ratio is a value within a predetermined range (for example, 0.9 to 1.1), the stretching processing unit 258 does not extend or contract widths of any of the histograms.

Here, a width of a histogram indicates a length from a minimum value to a maximum value of pixel values whose frequencies are 1 or more in the histogram. In addition, the stretching processing unit 258 may perform stretching such that a histogram having a small standard deviation is matched with a histogram having a large standard deviation, or perform reduction such that the histogram having a small standard deviation is matched with the histogram having a large standard deviation. For example, when the standard deviation of the current histogram is about 2.25 times the standard deviation of the previous histogram, a width of the previous histogram is stretched 2.25 times an original width. The stretching processing unit 258 supplies the stretched previous histogram and current histogram to the area adjusting unit 259.

The area adjusting unit 259 adjusts an area of one of the stretched previous histogram and current histogram and matches the area with an area of the other thereof. For example, when the area of the stretched previous histogram is twice the area of the stretched current histogram, a frequency of pixel values of the previous histogram is adjusted to ½. The area adjusting unit 259 supplies the current histogram and previous histogram whose areas are adjusted to the similarity determining unit 270.

While the normalizing unit 250 calculates a standard deviation from a histogram after shifting, since the standard deviation is not changed before and after shifting, the standard deviation may be calculated from a histogram before shifting.

In addition, while the normalizing unit 250 performs stretching after shifting, it may reversely perform shifting after stretching.

In addition, while the normalizing unit 250 performs adjustment of an area after stretching, it may supply a histogram to the similarity determining unit 270 without performing adjustment of the area. In addition, while the normalizing unit 250 normalizes both the standard deviation and the average value, it may normalize only the standard deviation. However, since there is a risk of erroneously determining a change in illumination as an interruption when the change in illumination is great, it is desirable to also normalize the average value in addition to the standard deviation.

[Configuration Example of Similarity Determining Unit]

Figure 4:
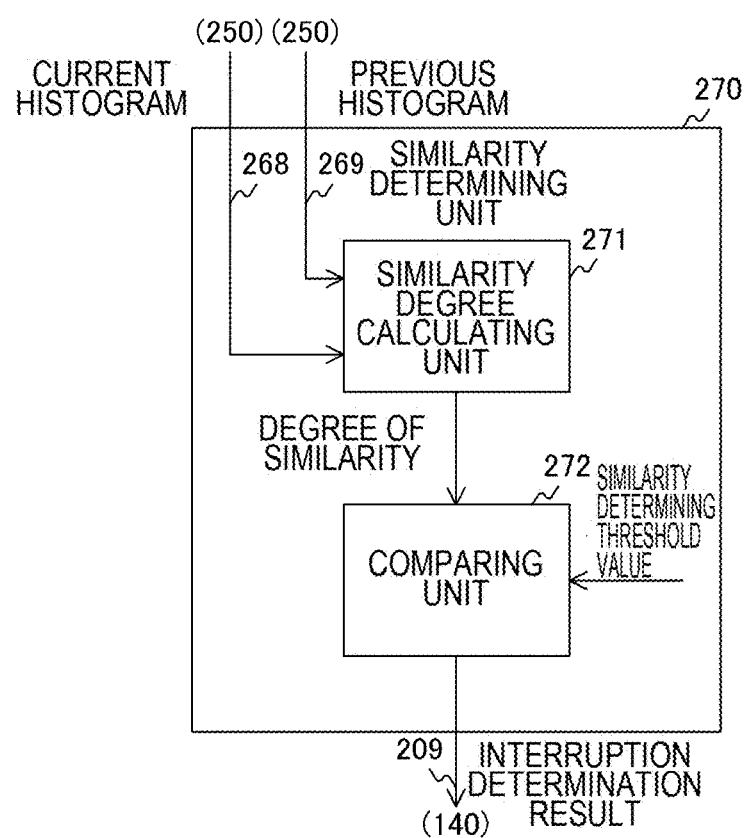
FIG. 4 is a block diagram illustrating a configuration example of a similarity determining unit in the first embodiment.

FIG. 4 is a block diagram illustrating a configuration example of the similarity determining unit 270 in the first embodiment. The similarity determining unit 270 includes a similarity degree calculating unit 271 and a comparing unit 272.

The similarity degree calculating unit 271 calculates a degree of similarity of shapes of the previous histogram and the current histogram after normalization. The degree of similarity is calculated by, for example, the following formula. The similarity degree calculating unit 271 supplies the calculated degree of similarity to the comparing unit 272. The similarity degree calculating unit 271 is an example of a similarity degree acquiring unit described in the appended claims.

[Math. 3]

$$t = \sum_{a=0}^{i} \min(x_{a\_p}, x_{a\_q})$$  Formula 3

In the above formula, t denotes a degree of similarity. In addition, $x_{a\_p}$ denotes a frequency of the luminance value $f_a$ in a previous histogram and $x_{a\_q}$ denotes a frequency of the luminance value $f_a$ in a current histogram. min( ) is a function that returns a smaller value between two values. According to the above formula, as similarity increases (in other words, as change decreases), a higher value is calculated as a degree of similarity.

The similarity degree calculating unit 271 may calculate a degree of similarity by a formula other than Formula 3. For example, the similarity degree calculating unit 271 may calculate a correlation coefficient as a degree of similarity. As similarity increases, a value of the correlation coefficient increases.

In addition, the similarity degree calculating unit 271 may perform calculation such that, as similarity increases (in other words, as change decreases), a smaller value is set as a degree of similarity according to a formula other than Formula 3. For example, when a sum value of differences between $x_{a\_p}$ and $x_{a\_q}$ of luminance values is calculated as a degree of similarity, a smaller value is obtained as similarity increases.

In addition, the similarity degree calculating unit 271 may obtain an amount of frequency features of histograms using, for example, a Fourier transform, and calculate a difference thereof as a degree of similarity. When area adjustment is not performed in normalization, such an amount of frequency features is used.

The comparing unit 272 compares a degree of similarity with a predetermined similarity determining threshold value and determines whether the degree of similarity is greater than the similarity determining threshold value. According to Formula 3, as similarity increases, a higher value is calculated as a degree of similarity. Therefore, when it is determined that the degree of similarity is greater than the similarity determining threshold value, the similarity determining unit 270 generates an interruption determination result indicating that no interruption has occurred, and otherwise, generates an interruption determination result indicating that an interruption has occurred.

On the other hand, when a smaller value is calculated as a degree of similarity as similarity increases, the similarity determining unit 270 generates a reverse interruption determination result. That is, when it is determined that the degree of similarity is greater than the similarity determining threshold value, the similarity determining unit 270 generates an interruption determination result indicating that an interruption has occurred, and otherwise, generates an interruption determination result indicating that no interruption has occurred.

FIG. 5 shows diagrams illustrating examples of a previous frame and a current frame when illumination is changed in the first embodiment. FIG. 5a shows an example of a previous frame 501. FIG. 5b shows an example of a current frame 502. Illumination is changed between the previous frame 501 and the current frame 502, and brightness of the current frame 502 is generally lower than the previous frame 501.

FIG. 6 shows diagrams illustrating examples of a histogram before normalization when illumination is changed in the first embodiment. In FIG. 6, the horizontal axis represents a luminance value and the vertical axis represents the number of pixels of the luminance value, that is, a frequency.

FIG. 6a shows an example of a previous histogram generated from the previous frame 501 of FIG. 5. In a previous histogram A, a frequency of a luminance value of 7 is 4, a frequency of a luminance value of 8 is 8, and a frequency of a luminance value of 9 is 4. Frequencies of the other luminance values are 0. Based on Formula 1, an average value $u_A$ of the previous histogram is calculated by the following formula.

$$u_A = (7 \times 4 + 8 \times 8 + 9 \times 4)/16 = 8 \quad \text{Formula 4}$$

In addition, based on Formula 2 and Formula 4, a standard deviation $s_A$ of the previous histogram is calculated by the following formula.

$$s_A = \{((7-8)^2 \times (8-8)^2 \times 8 + (9-8)^2 \times 4)/16\}^{1/2} \quad \text{Formula 5}$$
$$= 0.7$$

FIG. 6b shows an example of a current histogram generated from the current frame 502 of FIG. 5. Frequencies of luminance values of 1 and 7 of the current histogram are 1, luminance values of luminance values of 2 and 6 are 2 and frequencies of luminance values of 3 and 5 are 3. In addition, a frequency of a luminance value of 4 is 4, and frequencies of the other luminance values are 0. Based on Formula 1, an average value $u_B$ of the previous histogram is calculated by the following formula.

$$u_B = (1 \times 1 + 2 \times 2 + 3 \times 3 + 4 \times 4 + 5 \times 3 + 6 \times 2 + 7 \times 1)/16 \quad \text{Formula 6}$$
$$= 4$$

In addition, based on Formula 2 and Formula 6, a standard deviation $s_A$ of the previous histogram is calculated by the following formula.

$$s_B = \{((5-8)^2 \times 1 + (6-9)^2 \times 2 + (7-8)^2 \times 3 + (8-8)^2 \times 4 + \quad \text{Formula 7}$$
$$(9-8)^2 \times 3 + (10-8)^2 \times 2 + (11-8)^2 \times 1)/16\}^{1/2}$$
$$= 1.58$$

According to Formula 4 and Formula 6, the previous histogram has an average value that is "4" greater than the current histogram. In this case, for example, the current histogram is shifted by a luminance value of "4" toward a higher luminance.

FIG. 7 shows diagrams illustrating examples of histograms after shifting when illumination is changed in the first embodiment. FIG. 7a shows a previous histogram and FIG. 7b shows a current histogram after shifting. As illustrated in FIG. 7, average values of the current histogram and the previous histogram are normalized to the same value ("8") according to the shifting.

According to Formula 5 and Formula 7, a standard deviation of the current histogram is about "2.25" times a standard deviation of the previous histogram. In this case, for example, a width of the previous histogram is stretched about "2.25" times.

FIG. 8 shows diagrams illustrating examples of histograms after stretching when illumination is changed in the first embodiment. FIG. 8a shows a previous histogram after stretching and FIG. 8b shows a current histogram after shift. As illustrated in FIG. 8, average values of the current histogram and the previous histogram are normalized to the same value ("1.58") according to the stretching.

A sum of frequencies of the previous histogram after stretching is 32. On the other hand, a sum of frequencies of the current histogram is 16. Since an area of the previous histogram is twice an area of the current histogram, an adjustment of halving the area of the previous histogram is performed.

FIG. 9 shows diagrams illustrating examples of histograms after normalization when illumination is changed in the first embodiment. FIG. 9a shows a previous histogram after area adjustment and FIG. 9b shows a current histogram after shifting. As illustrated in FIG. 9, according to the area adjustment, sums of frequencies of the current histogram and the previous histogram are normalized to the same value ("32"). In addition, shaded portions in FIG. 9 indicate frequencies corresponding to min ($x_{a\_p}$, $x_{a\_q}$) of Formula 3 (in other words, portions in which frequencies match).

As exemplified in FIG. 6, a width of the histogram may be changed when illumination is changed. When the illumination is changed, if only an average is normalized, similarity of the histogram after normalization decreases as exemplified in FIG. 7. As a result, there is a risk of the change in illumination being erroneously determined as an interruption.

On the other hand, the image processing unit 200 also normalizes the standard deviation as exemplified in FIG. 8. Therefore, even when the illumination is changed and thus the width of the histogram is changed, similarity of a shape of the histogram after normalization increases and it is possible to suppress the erroneous determination of the change in illumination as an interruption. Accordingly, the image processing unit 200 can accurately determine whether an interruption has occurred.

FIG. 10 shows diagrams illustrating examples of a previous frame and a current frame when an interruption has occurred in the first embodiment. FIG. 10a shows an example of a previous frame 503 before an interruption is performed. FIG. 10b shows an example of a current frame 504 when an interruption has occurred. As illustrated in FIG. 10b, a lens portion of the imaging device 100 is blocked with a hand of a human.

FIG. 11 shows diagrams illustrating examples of histograms after normalization when an interruption has occurred in the first embodiment. FIG. 11a shows an example of a previous histogram after normalization and FIG. 11b shows an example of a current histogram after normalization. Shaded portions in FIG. 11 indicate frequencies corresponding to min ($x_{a\_p}$, $x_{a\_q}$) of Formula 3 (in other words, portions in which frequencies match). As illustrated in FIG. 11, while average values and standard deviations are normalized to approximately the same values, portions in which frequencies match are reduced and a similarity of shapes decreases. This is because a large change occurred due to an interruption to an extent that the shapes do not match even if a width of the histogram is changed. In this manner, the image processing unit 200 can accurately determine whether an interruption has occurred according to normalization of the standard deviation and the average value.

[Operation Example of Image Processing Unit]

Figure 12:
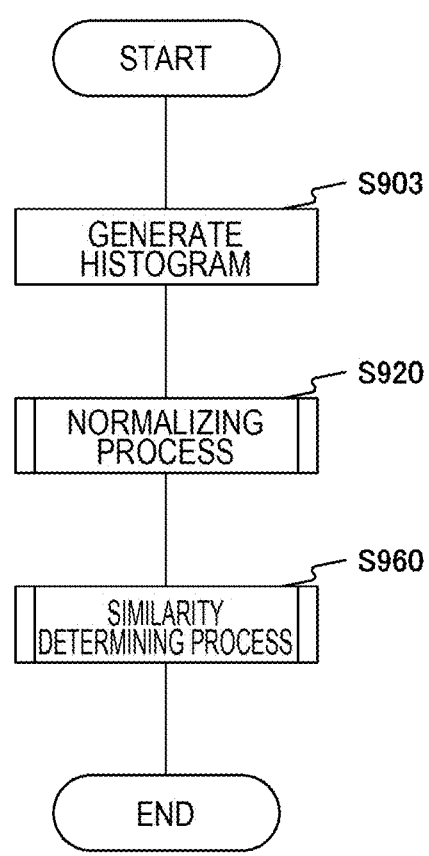
FIG. 12 is a flowchart illustrating an example of image processing in the first embodiment.

FIG. 12 is a flowchart illustrating an example of image processing in the first embodiment. This operation is performed, for example, whenever a frame is generated.

The image processing unit 200 generates histograms of a current frame and a previous frame (Step S903). Then, the image processing unit 200 performs a normalizing process (Step S920), and performs a similarity determining process (Step S960). After Step S960, the image processing unit 200 ends the image processing. In FIG. 12, processing such as demosaic processing is omitted.

Figure 13:
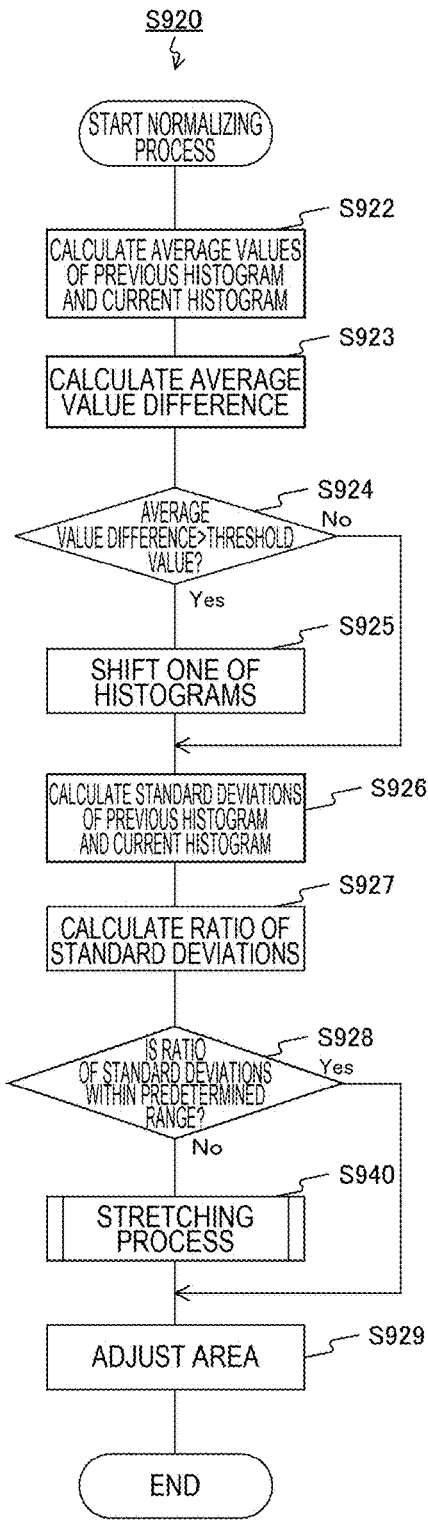
FIG. 13 is a flowchart illustrating an example of a normalizing process in the first embodiment.

FIG. 13 is a flowchart illustrating an example of a normalizing process in the first embodiment. The image processing unit 200 calculates average values of a previous histogram and a current histogram (Step S922), and calculates a difference thereof (Step S923). Then, the image processing unit 200 decides whether an average value difference is greater than an average difference threshold value (Step S924). When the average value difference is greater than the average difference threshold value (Yes in Step S924), the image processing unit 200 shifts one of the previous histogram and the current histogram by the average value difference and normalizes the average values (Step S925). Alternatively, the image processing unit 200 may always perform shifting without performing Step S924.

When the average value difference is equal to or smaller than the average difference threshold value (No in Step S924) or after Step S925, the image processing unit 200 calculates standard deviations of the previous histogram and the current histogram (Step S926). The image processing unit 200 calculates a ratio of these standard deviations (Step S927). Then, the image processing unit 200 decides whether the standard deviation ratio is within a predetermined range (Step S928). When the standard deviation ratio is outside the predetermined range (No in Step S928), the image processing unit 200 performs a stretching process (Step S940). Alternatively, the image processing unit 200 may always perform the stretching process without performing Step S928.

When the standard deviation ratio is within the predetermined range (Yes in Step S928) or after Step S940, the image processing unit 200 adjusts areas of the previous histogram and the current histogram (Step S929) and ends the normalizing process.

Figure 14:
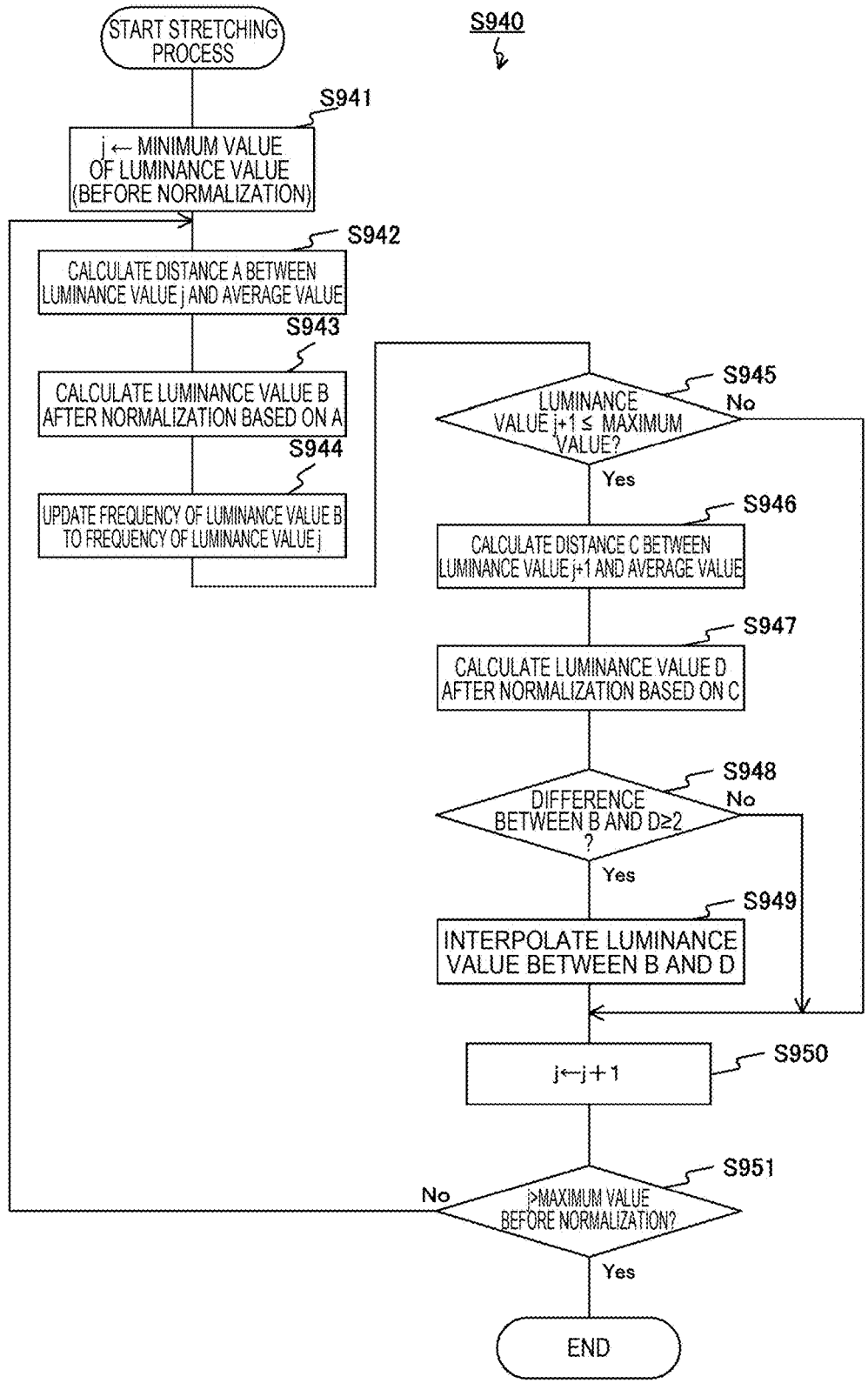
FIG. 14 is a flowchart illustrating an example of a stretching process in the first embodiment.

FIG. 14 is a flowchart illustrating an example of a stretching process in the first embodiment. The image processing unit 200 sets a minimum value of luminance values in a histogram before normalization to a variable j (Step S941). The image processing unit 200 calculates a difference between the luminance value j and an average value of the histogram as a distance A (Step S942). Then, the image processing unit 200 uses the following formula to calculate a luminance value B after normalization based on the distance A (Step S943).

$$B = u + (A \times P_s) \quad \text{Formula 8}$$

In the above formula, u denotes an average value of a histogram of an extending or contracting target and $P_s$ denotes a standard deviation ratio of a value obtained by dividing a standard deviation of a histogram that is not extended or contracted by a standard deviation of the histogram of an extending or contracting target.

Here, when the luminance value B calculated in Formula 8 is a value that is greater than a luminance value range of the histogram, the luminance value B is set as a value that is closer to the calculated value between a maximum value and a minimum value within the range. When the luminance value B is a value that is outside the range, the image processing unit 200 may not perform Steps S944 to S948.

After the luminance value B is calculated, the image processing unit 200 updates a frequency of the luminance value B in the histogram to a frequency of the luminance value j (Step S944). Then, the image processing unit 200 decides whether a luminance value (j+1) is equal to or smaller than a maximum value of the luminance value before normalization (Step S945).

When the luminance value (j+1) is equal to or smaller than the maximum value of the luminance value before normalization (Yes in Step S945), the image processing unit 200 calculates a distance C between the luminance value (j+1) and an average value (Step S946). Then, the following formula is used to calculate a luminance value D after normalization based on the distance C (Step S947).

$$D = u + (C \times P_s) \quad \text{Formula 9}$$

After the luminance value D is calculated, the image processing unit 200 calculates an absolute value of a difference between the luminance value B and the luminance value D, and decides whether the value is equal to or greater than 2 (Step S948).

When the absolute value of the difference is equal to or greater than 2 (Yes in Step S948), the image processing unit 200 interpolates a luminance value E between B and D and a frequency $x_E$ of the luminance value E (Step S949). The luminance value E is obtained by a process in which B increments to D. In addition, the frequency $x_E$ is obtained by the following formula.

$$x_E = (E-B) \times x_j/(D-B) + (D-E) \times x_{j+1}/(D-B) \quad \text{Formula 10}$$

In the above formula, $x_j$ denotes a frequency of the luminance value j and $x_{j+1}$ denotes a frequency of the luminance value (j+1).

While the image processing unit 200 performs interpolation from frequencies of two luminance values, it may perform interpolation from frequencies of three or more luminance values. In addition, the image processing unit 200 may perform interpolation by assigning a weight to a frequency in the vicinity of an interpolation target.

When the luminance value (j+1) is greater than a maximum value of the luminance value before normalization (No in Step S945), an absolute value of the difference is smaller than 2 (No in Step S948) or after Step S949, the image processing unit 200 increments j (Step S950). The image processing unit 200 decides whether the incremented j is greater than a maximum value of the luminance value of the histogram before normalization (Step S951). When j is equal to or smaller than the maximum value (No in Step S951), the image processing unit 200 returns to Step S942, and otherwise (Yes in Step S951), ends the stretching process.

Figure 15:
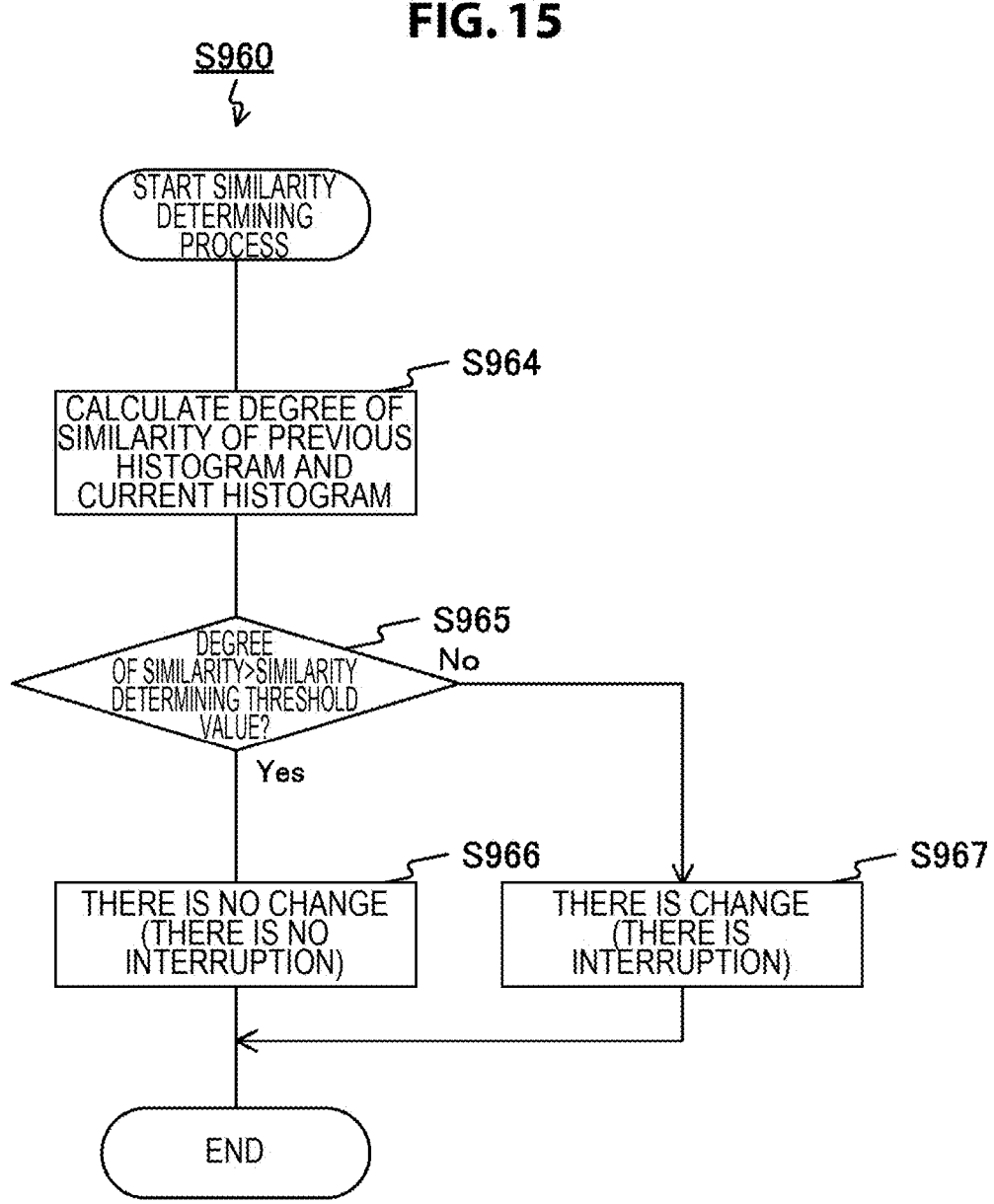
FIG. 15 is a flowchart illustrating an example of a similarity determining process in the first embodiment.

FIG. 15 is a flowchart illustrating an example of a similarity determining process in the first embodiment. The image processing unit 200 uses Formula 3 to calculate a degree of similarity of shapes of a previous histogram and a current histogram after normalization (Step S964). The image processing unit 200 decides whether the calculated degree of similarity is greater than a similarity determining threshold value (Step S965).

When the degree of similarity is greater than the similarity determining threshold value (Yes in Step S965), the image processing unit 200 decides that there is no sharp change between frames, that is, no interruption has occurred (Step S966). On the other hand, when the degree of similarity is equal to or smaller than the similarity determining threshold value (No in Step S965), the image processing unit 200 decides that there is a sharp change between frames, that is, an interruption has occurred (Step S967). After Step S966 or S967, the image processing unit 200 ends the similarity determining process.

In this manner, according to the first embodiment of the present technology, the image processing unit 200 normalizes standard deviations of the previous and current histograms and determines whether a degree of similarity of such shapes is greater than a threshold value. Therefore, it is possible to prevent a change in brightness from being erroneously determined as an interruption. Accordingly, the image processing unit 200 can accurately determine a sharp change in a frame due to an interruption.

2. Second Embodiment

In the first embodiment, while the similarity determining threshold value is set as a certain value, a 3rd- or higher-order moment may be obtained from histograms, and the similarity determining threshold value may be changed according to a difference of such moments. As the 3rd- or higher-order moment, for example, skewness is calculated.

As a difference of the skewness increases, a possibility of an interruption increases since a difference of symmetry of shapes increases. Therefore, when the similarity determining threshold value is changed according to a difference of the skewness, it is possible to increase accuracy of the interruption determination. The imaging device 100 of a second embodiment is different from that of the first embodiment in that the similarity determining threshold value is changed according to a difference of a moment.

Figure 16:
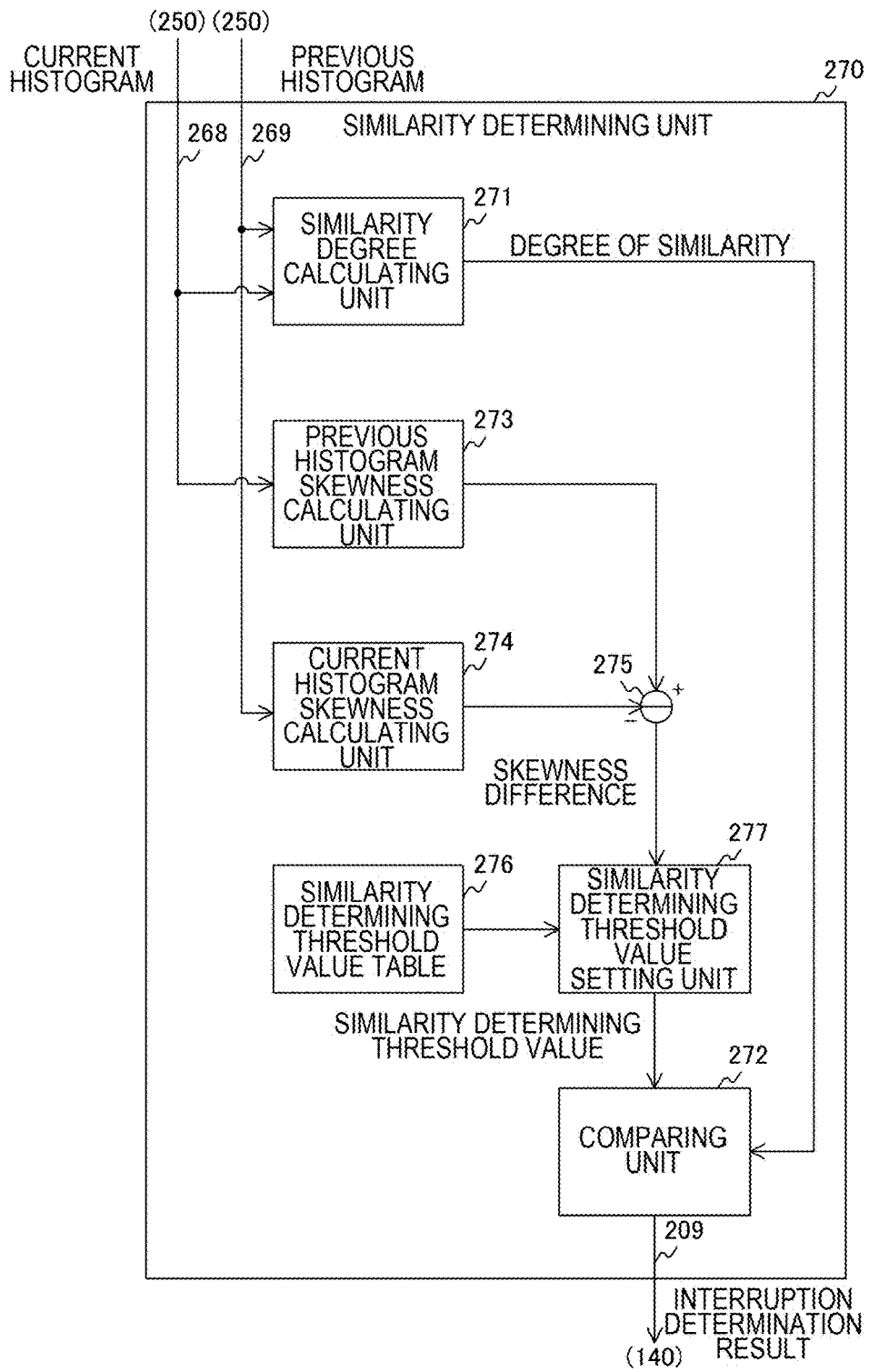
FIG. 16 is a block diagram illustrating a configuration example of a similarity determining unit in a second embodiment.

FIG. 16 is a block diagram illustrating a configuration example of the similarity determining unit 270 in the second embodiment. The similarity determining unit 270 of the second embodiment is different from that of the first embodiment in that a previous histogram skewness calculating unit 273, a current histogram skewness calculating unit 274, a subtractor 275, a similarity determining threshold value table 276 and a similarity determining threshold value setting unit 277 are further included.

The previous histogram skewness calculating unit 273 uses, for example, the following formula to calculate skewness of the previous histogram. The previous histogram skewness calculating unit 273 supplies the calculated skewness to the subtractor 275.

[Math. 4]

$$d = \frac{1}{n \times s^3} \cdot \sum_{a=0}^{i} \{(x_a - u)^3 \times x_a\} \quad \text{Formula 11}$$

In the above formula, d denotes skewness.

The current histogram skewness calculating unit 274 uses Formula 11 and calculates skewness of the current histogram. The current histogram skewness calculating unit 274 supplies the calculated skewness to the subtractor 275.

The subtractor 275 subtracts the skewness of one of the previous histogram and the current histogram from the skewness of the other thereof. For example, the skewness of the current histogram is subtracted from the skewness of the previous histogram. The subtractor 275 supplies a subtraction result to the similarity determining threshold value setting unit 277 as a skewness difference. The subtractor 275 is an example of a moment difference calculating unit described in the appended claims.

The similarity determining threshold value setting unit 277 acquires and sets a similarity determining threshold value according to the skewness difference from the similarity determining threshold value table 276, and supplies the value to the comparing unit 272. For example, when an absolute value of the skewness difference is greater than a predetermined skewness difference threshold value, Th1 is set as the similarity determining threshold value, and otherwise, Th2 is set as the similarity determining threshold value.

According to Formula 3, when a higher value is used as a degree of similarity as similarity increases (in other words, as change decreases), Th1 is set to a value that is greater than Th2. On the other hand, when a smaller value is used as a degree of similarity as similarity increases (in other words, as change decreases), Th1 is set to a value that is smaller than Th2.

While the similarity determining threshold value setting unit 277 switches two threshold values according to whether a setting value of the skewness difference is greater than the skewness difference threshold value, three or more threshold values may be set according to the skewness difference. For example, two or more skewness difference threshold values are set and the similarity determining threshold value setting unit 277 may set three or more threshold values according to a comparison result thereof. In addition, while the similarity determining threshold value setting unit 277 reads a threshold value from the table, a predetermined function (for example, a primary function) indicating a relation between the skewness difference and the similarity determining threshold value may be used to calculate the similarity determining threshold value from the skewness difference.

The similarity determining threshold value table 276 is a table in which a plurality of similarity determining threshold values according to skewness differences are maintained.

While the image processing unit 200 calculates skewness as a 3rd-or higher-order moment, a moment other than skewness may be calculated. For example, the image processing unit 200 may calculate kurtosis instead of skewness.

In addition, the image processing unit 200 calculates a degree of similarity using Formula 3 and compares it with the similarity determining threshold value to determine whether there is a change. Alternatively, the image processing unit 200 may calculate a 3rd- or higher-order moment (such as skewness) as a degree of similarity and compare the moment with a fixed similarity determining threshold value to determine whether there is a change. In this case, only the moment is calculated without using Formula 3.

In addition, the image processing unit 200 calculates a plurality of moments such as kurtosis and skewness, and may set the similarity determining threshold value based on such moments. In this case, for example, a weighted addition of a difference of kurtosis and a difference of skewness is performed and the similarity determining threshold value is set according to the added value.

Figure 17:
FIG. 17 is a diagram illustrating an example of a similarity determining threshold value table in the second embodiment.

FIG. 17 is a diagram illustrating an example of the similarity determining threshold value table 276 in the second embodiment. In the similarity determining threshold value table 276, the similarity determining threshold value Th1 is stored in association with an absolute value of the skewness difference whose range is greater than the skewness difference threshold value. In addition, the similarity determining threshold value Th2 is stored in association with the absolute value of the skewness difference whose range is equal to or smaller than the skewness difference threshold value. For example, Th1 is set to a value that is greater than Th2.

FIG. 18 shows diagrams illustrating examples of histograms after normalization when an interruption has occurred in the second embodiment. FIG. 18a is a diagram illustrating an example of a previous histogram after normalization when an interruption has occurred. FIG. 18b is a diagram illustrating an example of a current histogram after normalization when an interruption has occurred.

In the previous histogram after normalization, a frequency of a luminance value of 6 is 4, a frequency of a luminance value of 7 is 3, a frequency of a luminance value of 8 is 2, and a frequency of a luminance value of 9 is 1, and frequencies of the other luminance values are 0. In addition, in the current histogram after normalization, a frequency of a luminance value of 6 is 1, a frequency of a luminance value of 7 is 2, a frequency of a luminance value of 8 is 3, a frequency of a luminance value of 9 is 4, and frequencies of the other luminance values are 0. In addition, average values and standard deviations are 7 and 1 in the previous histogram and the current histogram.

Based on Formula 11, skewness $d_A$ of the previous histogram is calculated by the following formula.

$$d_A = \{(6-7)^3 \times 4 + (7-7)^3 \times 3 + (8-7)^3 \times 2 + \quad \text{Formula 12}$$
$$(9-7)^3 \times 1\}/10 \times 1^3$$
$$= 0.6$$

In addition, based on Formula 11, skewness $d_B$ of the previous histogram is calculated by the following formula.

$$d_B = \{(5-7)^3 \times 4 + (6-7)^3 \times 3 + (7-7)^3 \times 2 + \quad \text{Formula 13}$$
$$(8-7)^3 \times 1\}/10 \times 1^3$$
$$= -0.6$$

According to Formula 12 and Formula 13, a skewness difference is 1.2. When a difference threshold value is, for example, 1.0, since an absolute value of the skewness difference is greater than the difference threshold value, the similarity determining threshold value Th1 is set so that it is easily determined that there is a change.

When the standard deviation is normalized in addition to the average, it is possible to prevent a change in brightness from being erroneously determined as an interruption. On the other hand, there is a high possibility of erroneously determining that no interruption has occurred when an interruption has occurred. Therefore, when the similarity determining threshold value is set according to the skewness difference, it is possible to reduce such an interruption detection failure.

Figure 19:
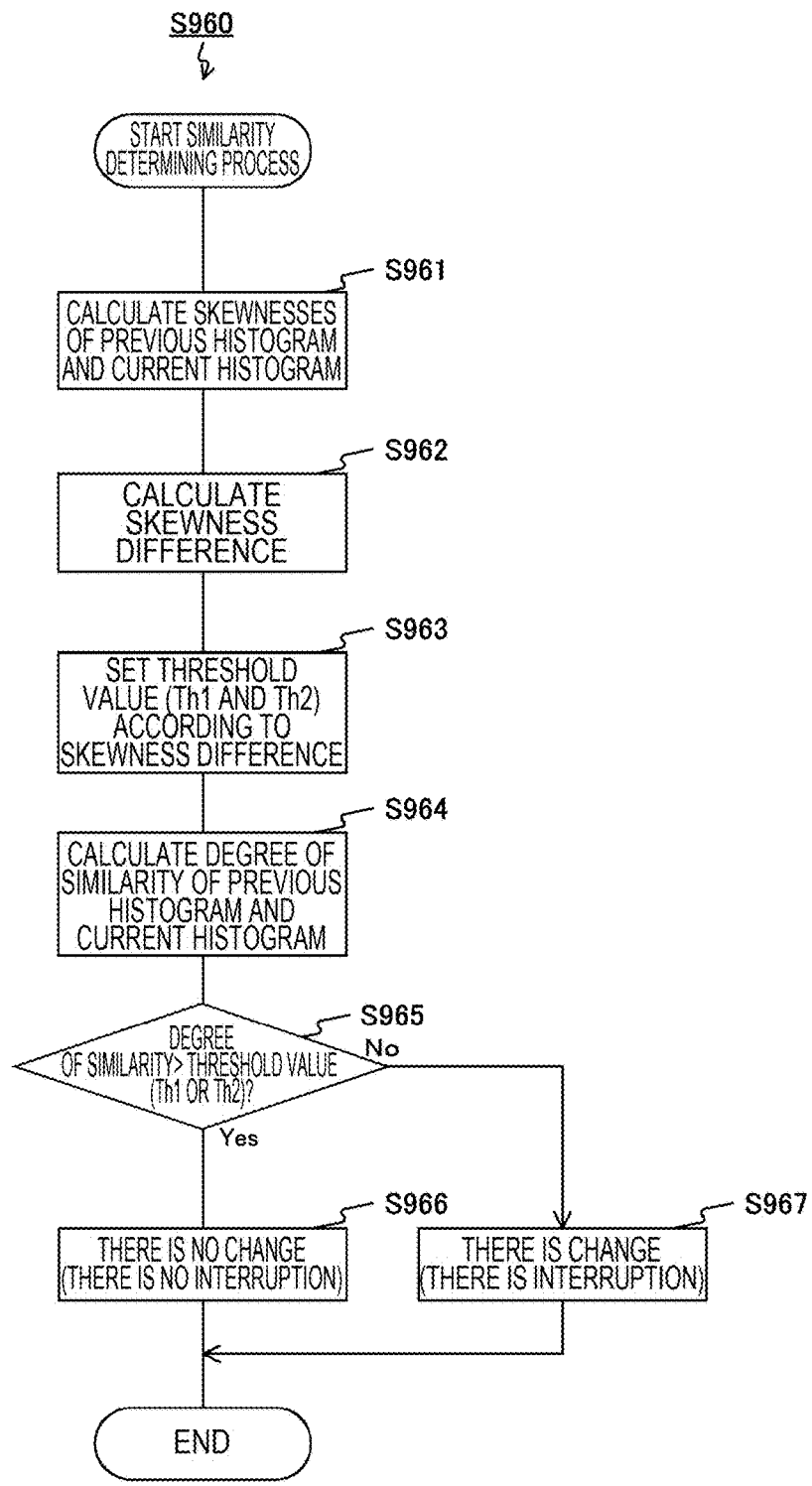
FIG. 19 is a flowchart illustrating an example of a similarity determining process in the second embodiment.

FIG. 19 is a flowchart illustrating an example of a similarity determining process in the second embodiment. The image processing unit 200 calculates skewnesses of a previous histogram and a current histogram (Step S961), and calculates a difference thereof (Step S962). The image processing unit 200 sets a similarity determining threshold value (Th1 and Th2) according to an absolute value of the skewness difference (Step S963), and decides whether a degree of similarity is greater than the threshold value (Step S965).

In this manner, according to the second embodiment of the present technology, the image processing unit 200 sets the similarity determining threshold value according to the skewness difference and determines whether a degree of similarity is greater than the value. Therefore, it is possible to determine a sharp change in a frame due to an interruption more accurately.

3. Third Embodiment

While a histogram is generated from pixel values in the entire frame in the first embodiment, a histogram may be generated from a part of the frame. When a histogram is generated from a part of the frame, it is possible to reduce an amount of computation of the image processing unit 200 in comparison to when a histogram is generated from the entire frame. The image processing unit 200 of a third embodiment is different from that of the first embodiment in that a histogram is generated from a part of the frame.

Figure 20:
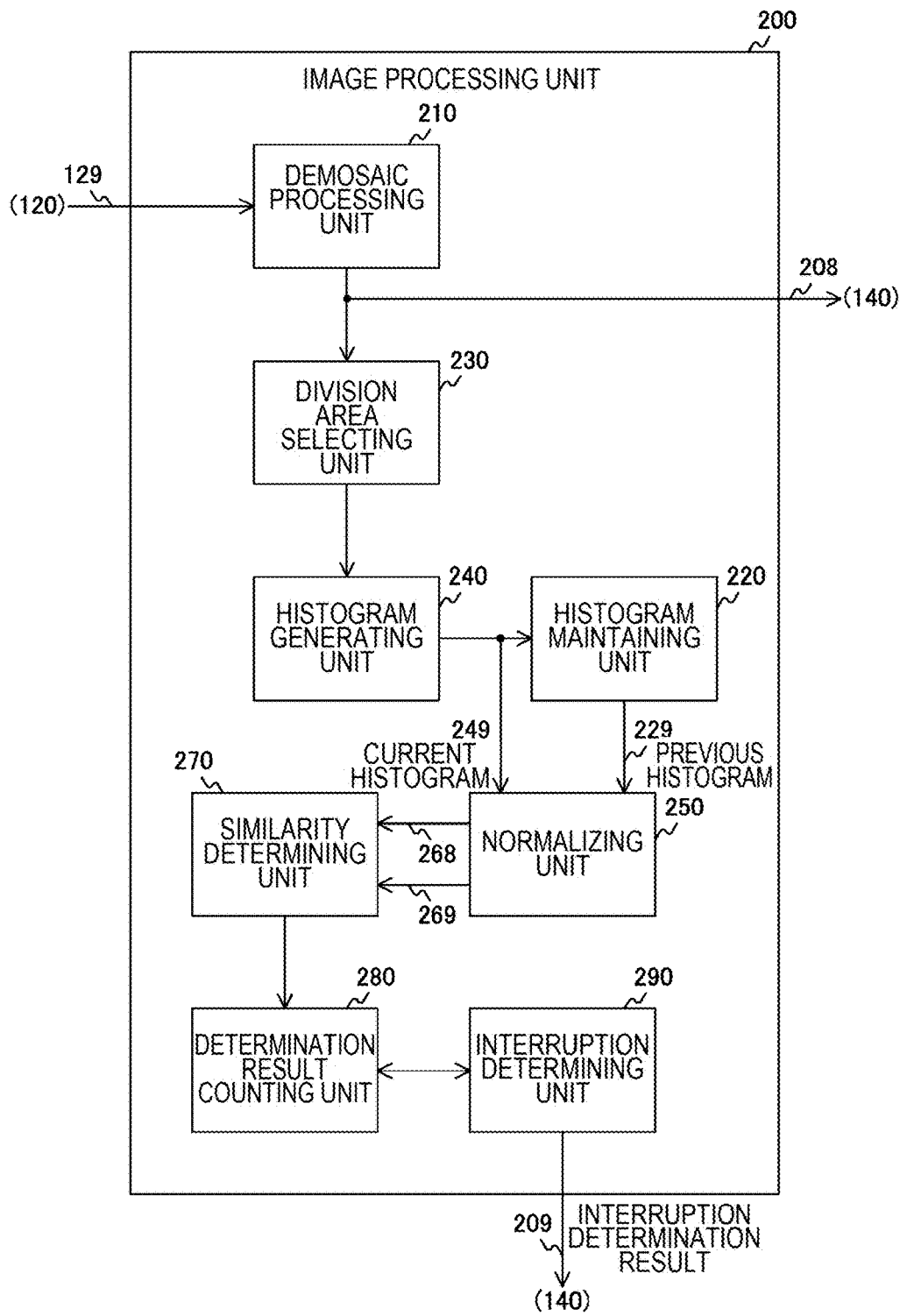
FIG. 20 is a block diagram illustrating a configuration example of an image processing unit in a third embodiment.

FIG. 20 is a block diagram illustrating a configuration example of the image processing unit 200 in the third embodiment. The image processing unit 200 of the third embodiment is different from that of the first embodiment in that a division area selecting unit 230, a determination result counting unit 280 and an interruption determining unit 290 are further included.

The division area selecting unit 230 divides a frame into a plurality of blocks (for example, 64 blocks) and sequentially selects a predetermined number of blocks (for example, 4 blocks) from among the blocks for each frame. The division area selecting unit 230 supplies the selected blocks to the histogram generating unit 240. When four blocks are selected for each frame, four histograms for each frame are maintained in the histogram maintaining unit 220.

The similarity determining unit 270 of the third embodiment supplies a determination result to the determination result counting unit 280 as a similarity determination result rather than an interruption determination result.

The determination result counting unit 280 counts the number of times that the similarity determining unit 270 determines that there is a change (for example, a degree of similarity is equal to or smaller than a similarity determining threshold value) in each frame. The determination result counting unit 280 supplies the count value to the interruption determining unit 290.

The interruption determining unit 290 compares the count value from the determination result counting unit 280 with a predetermined interruption determining threshold value and determines whether an interruption has occurred based on the comparison result. The interruption determining unit 290 acquires the count value for each frame. For example, when the count value is greater than the interruption determining threshold value, the interruption determining unit 290 determines that an interruption has occurred, and otherwise, determines that no interruption has occurred.

The determination result counting unit 280 may count the number of times that it is determined that there is no change. In this case, when the count value is greater than the interruption determining threshold value, it is determined that no interruption has occurred, and otherwise, it is determined that an interruption has occurred.

Figure 21:
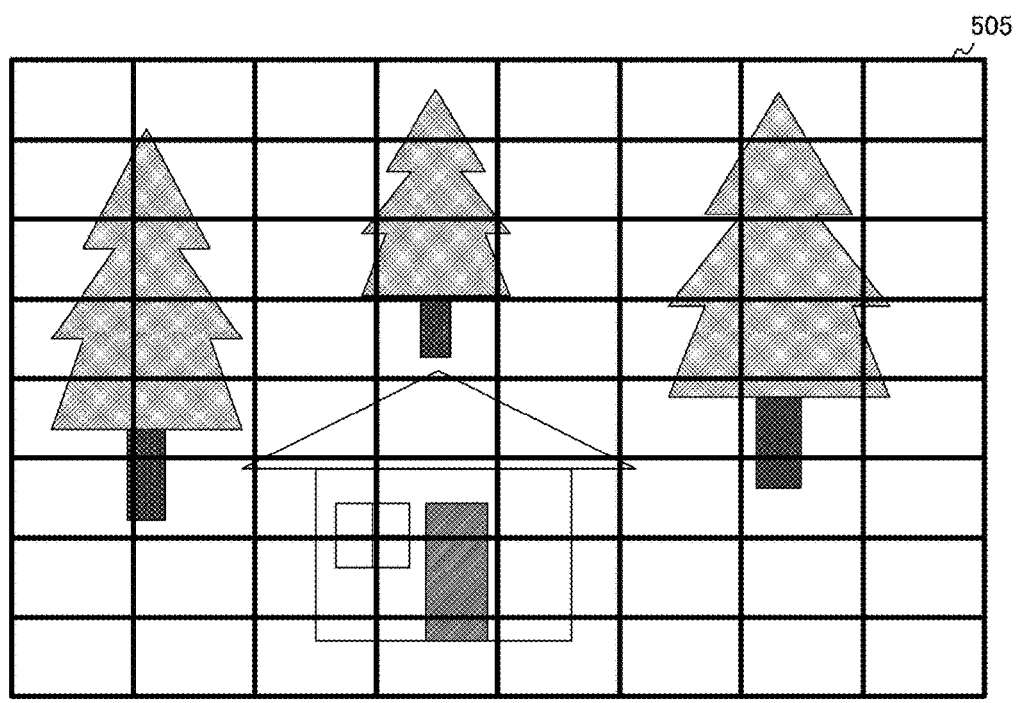
FIG. 21 is a diagram illustrating a division example of a frame in the third embodiment.

FIG. 21 is a diagram illustrating a division example of a frame 505 in the third embodiment. As illustrated in FIG. 21, the frame 505 is divided into, for example, 64 rectangular blocks (8 rows×8 columns). A division number and a division method are not limited to those of the exemplified drawing. The image processing unit 200 may divide a frame into, for example, 9 blocks (3×3) or 16 blocks (4×4).

FIG. 22 shows diagrams illustrating examples of a block selection order in the third embodiment. FIG. 22a is a diagram illustrating an example of initially selected blocks. A block positioned at an m-th row from the left and an n-th column from the top is set as $b_{nm}$, and four blocks $b_{11}$, $b_{18}$, $b_{81}$ and $b_{88}$ are initially selected.

FIG. 22b is a diagram illustrating an example of selected blocks for a second time. In the second time, four blocks $b_{12}$, $b_{17}$, $b_{82}$ and $b_{87}$ are selected. FIG. 22c is a diagram illustrating an example of selected blocks for a third time. In the third time, four blocks $b_{13}$, $b_{16}$, $b_{83}$ and $b_{86}$ are selected. FIG. 22d is a diagram illustrating an example of selected blocks for a fourth time. In the fourth time, four blocks $b_{14}$, $b_{15}$, $b_{84}$ and $b_{85}$ are selected. FIG. 22e is a diagram illustrating an example of selected blocks for a fifth time. In the fifth time, four blocks $b_{21}$, $b_{28}$, $b_{71}$ and $b_{78}$ are selected.

Then, according to the same procedure, four blocks are sequentially selected in one frame. That is, in an area of an upper half of a left half, from the left to the right within a row, rows are sequentially selected from the top to the bottom. In an area of an upper half of a right half, from the right to the left within a row, rows are sequentially selected from the top to the bottom. In an area of a lower half of a left half, from the left to the right within a row, rows are sequentially selected from the bottom to the top. In an area of a lower half of a right half, from the left to the right within a row, rows are sequentially selected from the bottom to the top.

While the image processing unit 200 selects blocks for each frame, it may select no blocks for a period of a predetermined number of frames (for example, 10 frames) after all blocks are sequentially selected across N frames, and may not perform similarity determination. In this case, the image processing unit 200 alternately repeats control in which similarity determination is performed across N frames and control in which no similarity determination is performed across the predetermined number of frames. By placing a gap of a period in which blocks are selected, it is possible to detect a slow interruption.

As exemplified in FIG. 22, at a cycle of 16 frames, positions of the selected blocks return to initial positions. Therefore, a histogram is generated from four blocks within a current frame and four blocks at the same positions within a previous frame 17 frames before the current frame.

Figure 23:
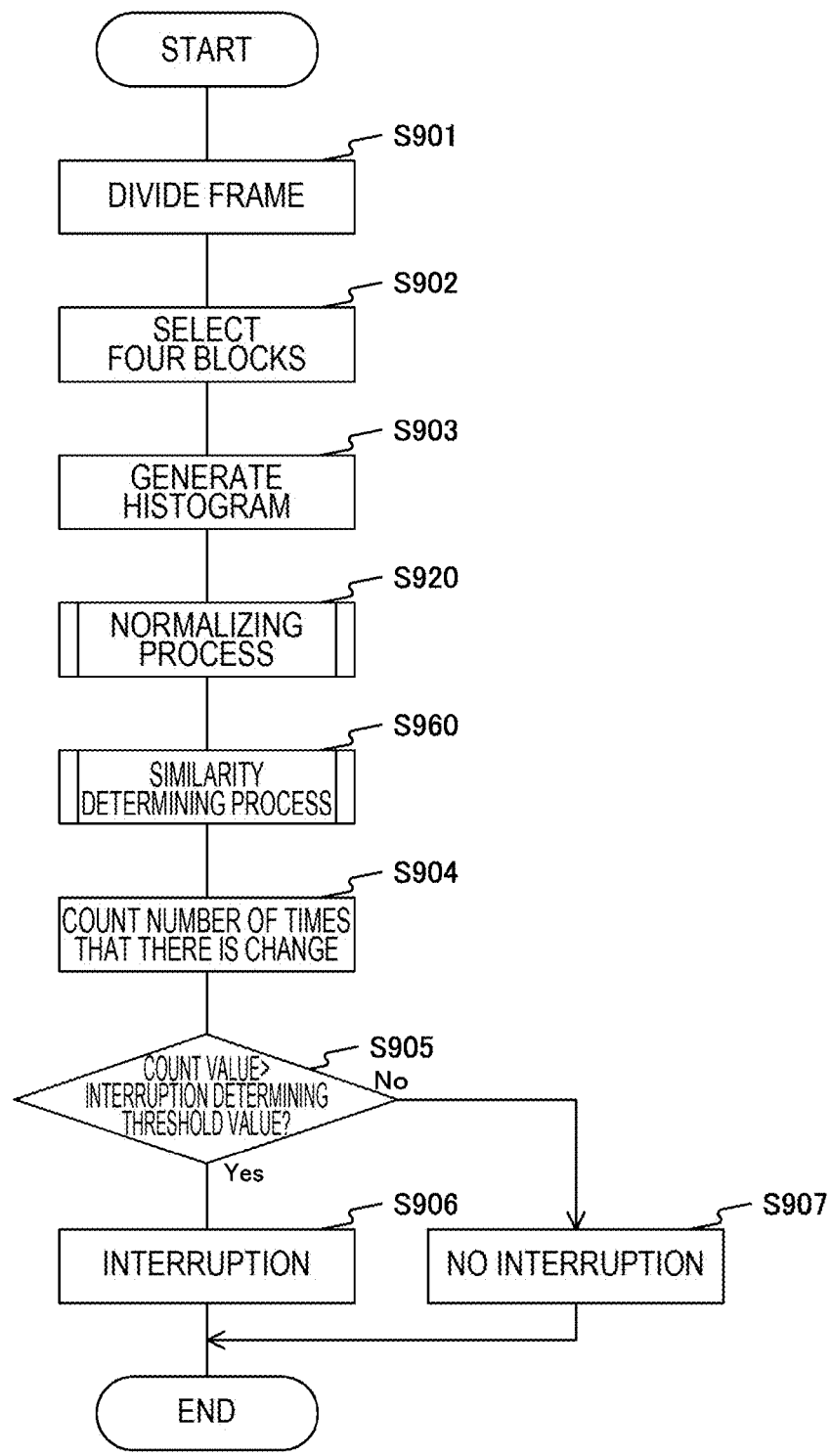
FIG. 23 is a flowchart illustrating an example of image processing in the third embodiment.

FIG. 23 is a flowchart illustrating an example of image processing in the third embodiment. The image processing unit 200 divides a current frame and a previous frame into 64 blocks (Step S901), and selects four blocks in each of the frames (Step S902). Then, the image processing unit 200 performs Steps S903, S920 and S960 of the selected blocks and counts the number of times that it is determined that there is a change (Step S904).

The image processing unit 200 determines whether the count value is greater than an interruption determining threshold value (Step S905). When the count value is greater than the interruption determining threshold value (Yes in Step S905), the image processing unit 200 determines that an interruption has occurred (Step S906). On the other hand, when the count value is equal to or smaller than the interruption determining threshold value (No in Step S905), the image processing unit 200 determines that no interruption has occurred (Step S907). After Step S906 or S907, the image processing unit 200 ends the image processing.

In this manner, according to the third embodiment, since the image processing unit 200 generates a histogram from a part of the frame, it is possible to reduce an amount of computation compared to when a histogram is generated from the entire frame.

4. Fourth Embodiment

Normalization is always performed in each frame in the third embodiment. Alternatively, it is determined whether normalization should be performed for each frame, and normalization can be performed only when normalization should be performed. The image processing unit 200 of a fourth embodiment is different from that of the third embodiment in that it is determined whether normalization should be performed and normalization is performed as necessary.

Figure 24:
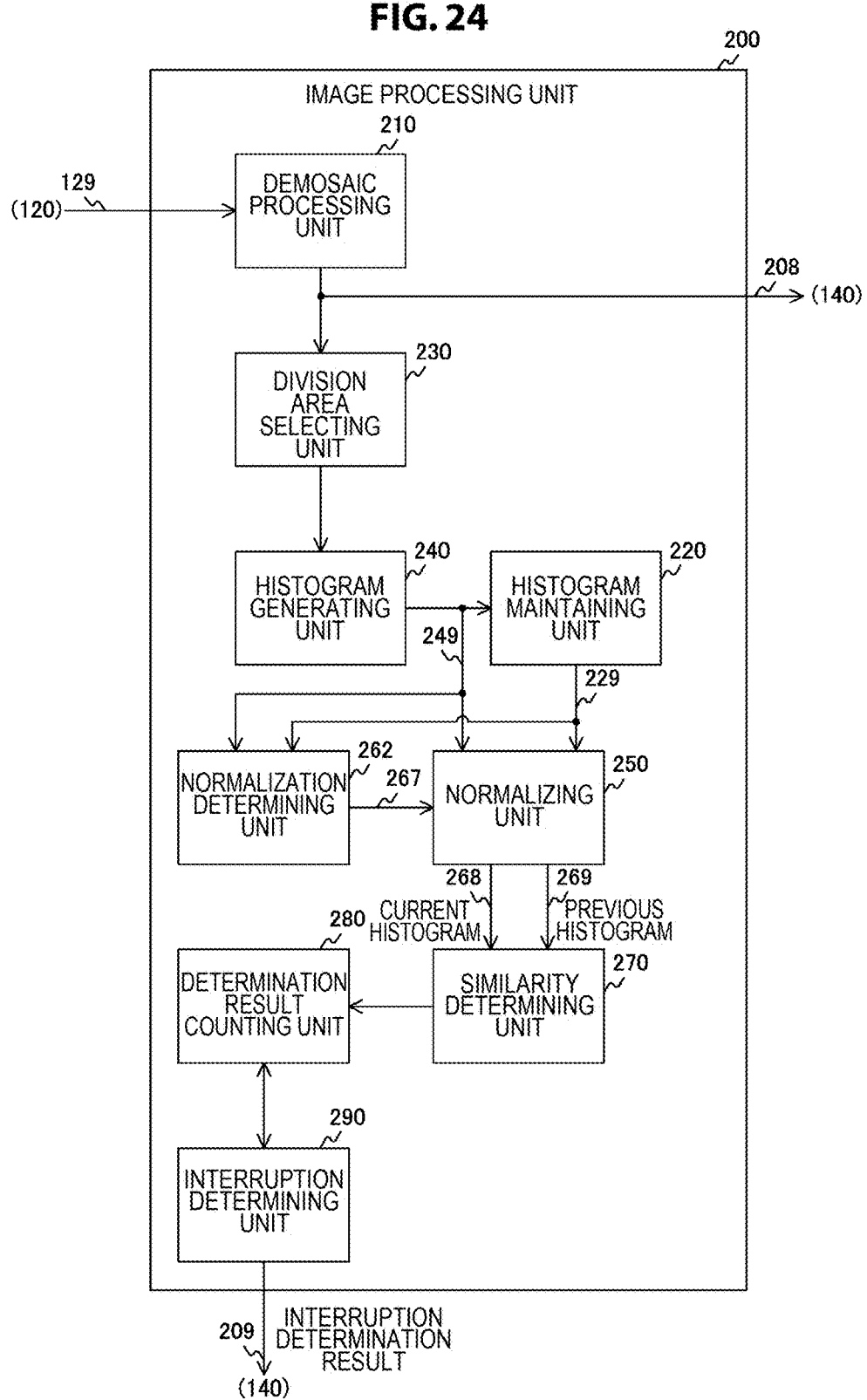
FIG. 24 is a block diagram illustrating a configuration example of an image processing unit in a fourth embodiment.

FIG. 24 is a block diagram illustrating a configuration example of the image processing unit 200 in the fourth embodiment. The image processing unit 200 of the fourth embodiment is different from that of the third embodiment in that a normalization determining unit 262 is further included.

The normalization determining unit 262 obtains an average value difference of a histogram for each block in four blocks and determines whether normalization should be performed based on the average value difference. For example, when all of the average value differences of four blocks have the same sign, the image processing unit 200 decides that there is a high possibility of illumination being changed since the four blocks have the same tendency of changes of average values and determines that normalization should be performed. On the other hand, when any of the signs of the average value differences of the four blocks is different, the normalization determining unit 262 determines that no normalization should be performed. The normalization determining unit 262 supplies the average value difference and the determination result to the normalizing unit 250.

The normalization determining unit 262 determines whether normalization is performed according to whether the signs of the average value differences match. Alternatively, the determination may be performed by another method. For example, the normalization determining unit 262 obtains a difference between an average value difference of any of the four blocks and average value differences of the other three blocks as an inter-block difference, and determines that normalization should be performed when all of the inter-block differences are smaller than a predetermined normalization determining threshold value.

In addition, the normalization determining unit 262 obtains a difference of the standard deviation for each block instead of the average value difference and may determine whether normalization is performed according to whether signs thereof match. In addition, the normalization determining unit 262 obtains the difference between the standard deviation difference of any of the four blocks and the standard deviation difference of the other three blocks as an inter-block difference, and may determine that normalization should be performed when all of the inter-block differences are smaller than the predetermined normalization determining threshold value.

In addition, the normalization determining unit 262 may obtain both of the average value difference and the standard deviation difference for each block. In this case, according to a logical sum or a logical product of a determination result (indicating whether all signs match) obtained from the average value difference and a determination result obtained from the standard deviation difference, it is determined whether normalization should be performed. In addition, the normalization determining unit 262 may determine whether normalization is performed according to a similar method from a difference of another statistic (such as a sum of pixel values) other than the average value and the standard deviation.

Figure 25:
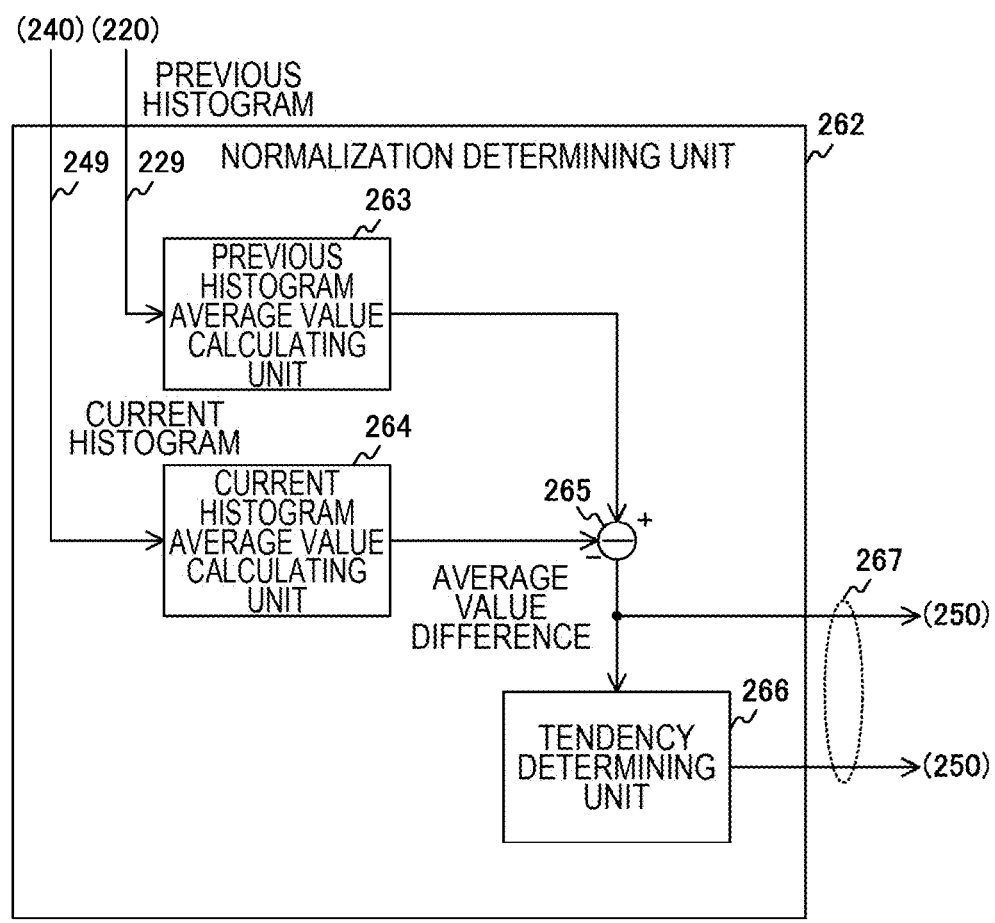
FIG. 25 is a block diagram illustrating a configuration example of a normalization determining unit in the fourth embodiment.

FIG. 25 is a block diagram illustrating a configuration example of the normalization determining unit 262 in the fourth embodiment. The normalization determining unit 262 includes a previous histogram average value difference calculating unit 263, a current histogram average value difference calculating unit 264, a subtractor 265 and a tendency determining unit 266.

The previous histogram average value difference calculating unit 263 calculates an average value of luminance values for each block from the previous histogram. The previous histogram average value difference calculating unit 263 sequentially supplies the calculated average values to the subtractor 265.

The current histogram average value difference calculating unit 264 calculates an average value of luminance values for each block from the current histogram. The current histogram average value difference calculating unit 264 sequentially supplies the calculated average values to the subtractor 265.

The subtractor 265 calculates an average value difference for each block. The subtractor 265 sequentially supplies the calculated average value differences to the tendency determining unit 266 and the normalizing unit 250 through a signal line 267.

The tendency determining unit 266 determines whether normalization should be performed according to whether signs of all of the average value differences match. The tendency determining unit 266 supplies the determined result to the normalizing unit 250 through the signal line 267 as a normalization determination result.

Figure 26:
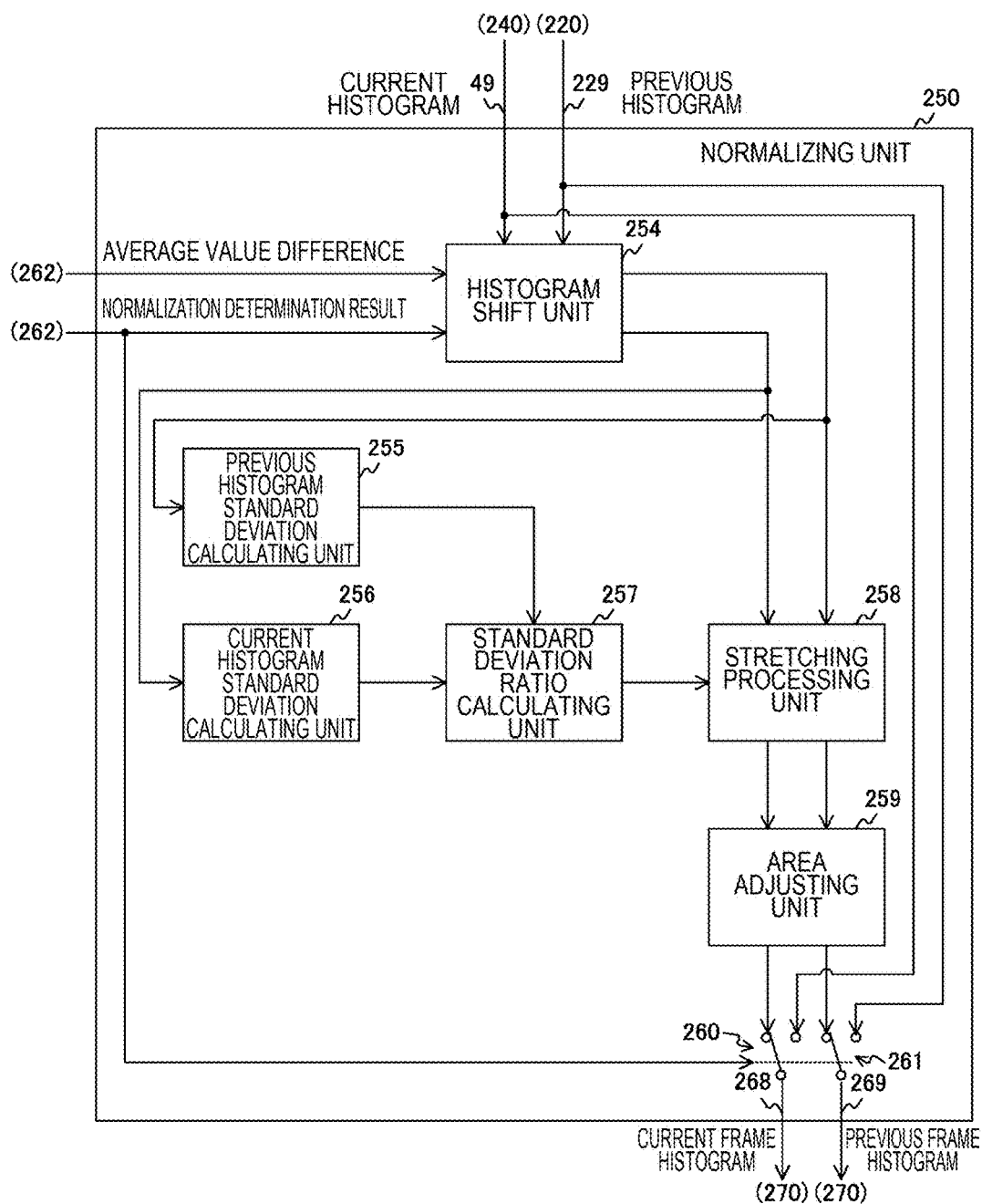
FIG. 26 is a block diagram illustrating a configuration example of a normalizing unit in the fourth embodiment.

FIG. 26 is a block diagram illustrating a configuration example of the normalizing unit 250 in the fourth embodiment. The normalizing unit 250 of the fourth embodiment is different from that of the third embodiment in that the previous histogram average value calculating unit 251, the current histogram average value calculating unit 252 and the subtractor 253 are not included but switching units 260 and 261 are further included.

When it is determined that normalization is performed, the histogram shift unit 254 of the fourth embodiment sums all average value differences for each block and shifts one of the previous histogram and the current histogram by a sum value thereof. On the other hand, when it is determined that no normalization is performed, the histogram shift unit 254 does not shift the histogram.

The switching unit 260 switches and outputs any of a previous histogram before normalization and a previous histogram after normalization based on the normalization determination result. When it is determined that normalization should be performed, the switching unit 260 supplies the previous histogram after normalization from the area adjusting unit 259 to the similarity determining unit 270 and otherwise, supplies the previous histogram before normalization from the histogram generating unit 240.

The switching unit 261 switches and outputs any of a current histogram before normalization and a current histogram after normalization based on the normalization determination result. When it is determined that normalization should be performed, the switching unit 261 supplies the current histogram after normalization from the area adjusting unit 259 to the similarity determining unit 270 and otherwise, supplies the current histogram before normalization from the histogram generating unit 240.

Figure 27:
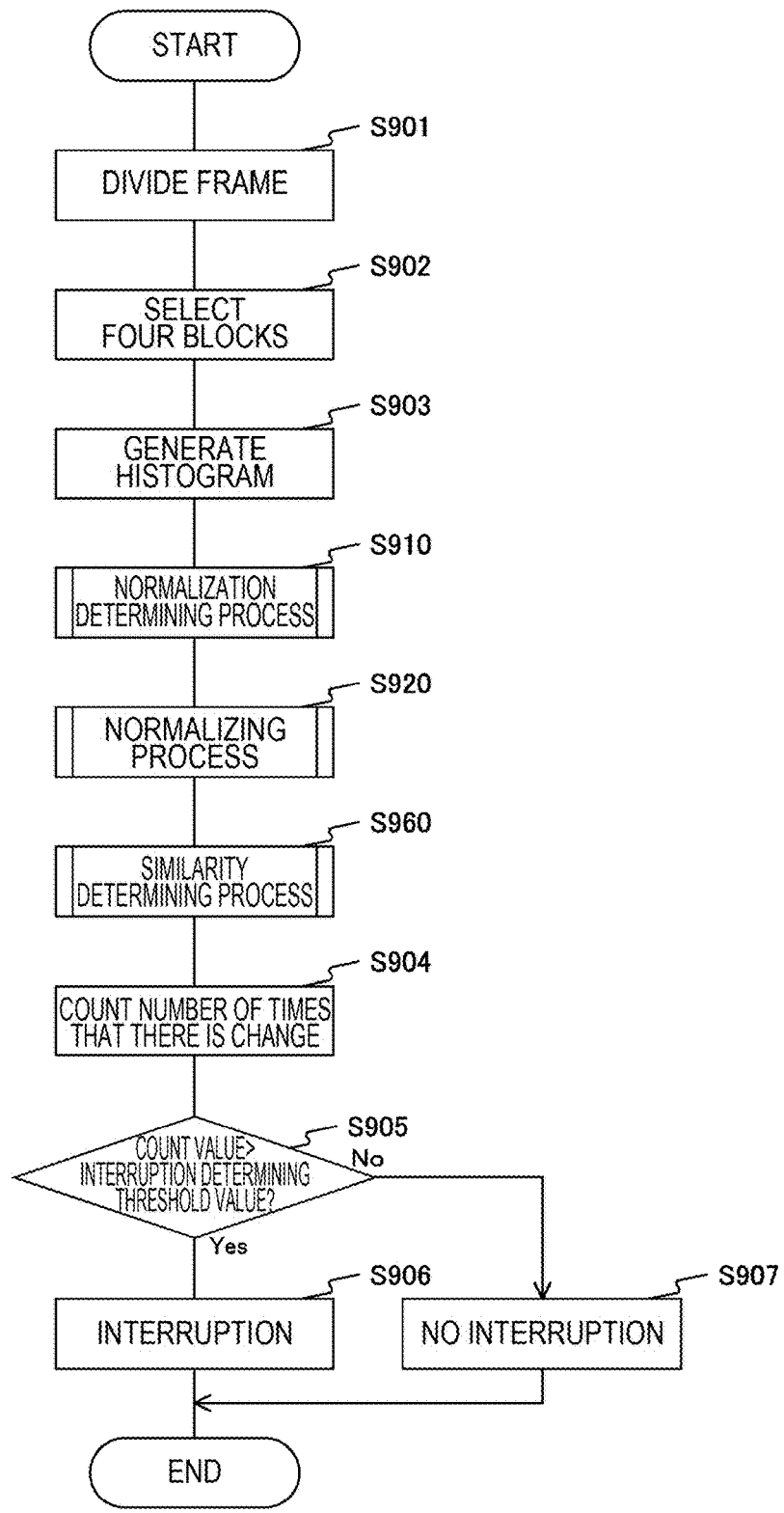
FIG. 27 is a flowchart illustrating an example of image processing in the fourth embodiment.

FIG. 27 is a flowchart illustrating an example of image processing in the fourth embodiment. The image processing of the fourth embodiment is different from that of the third embodiment in that a normalization determining process (Step S910) is further performed.

The image processing unit 200 performs a normalization determining process (Step S910) after histograms are generated (Step S903), and performs processes after Step S920.

Figure 28:
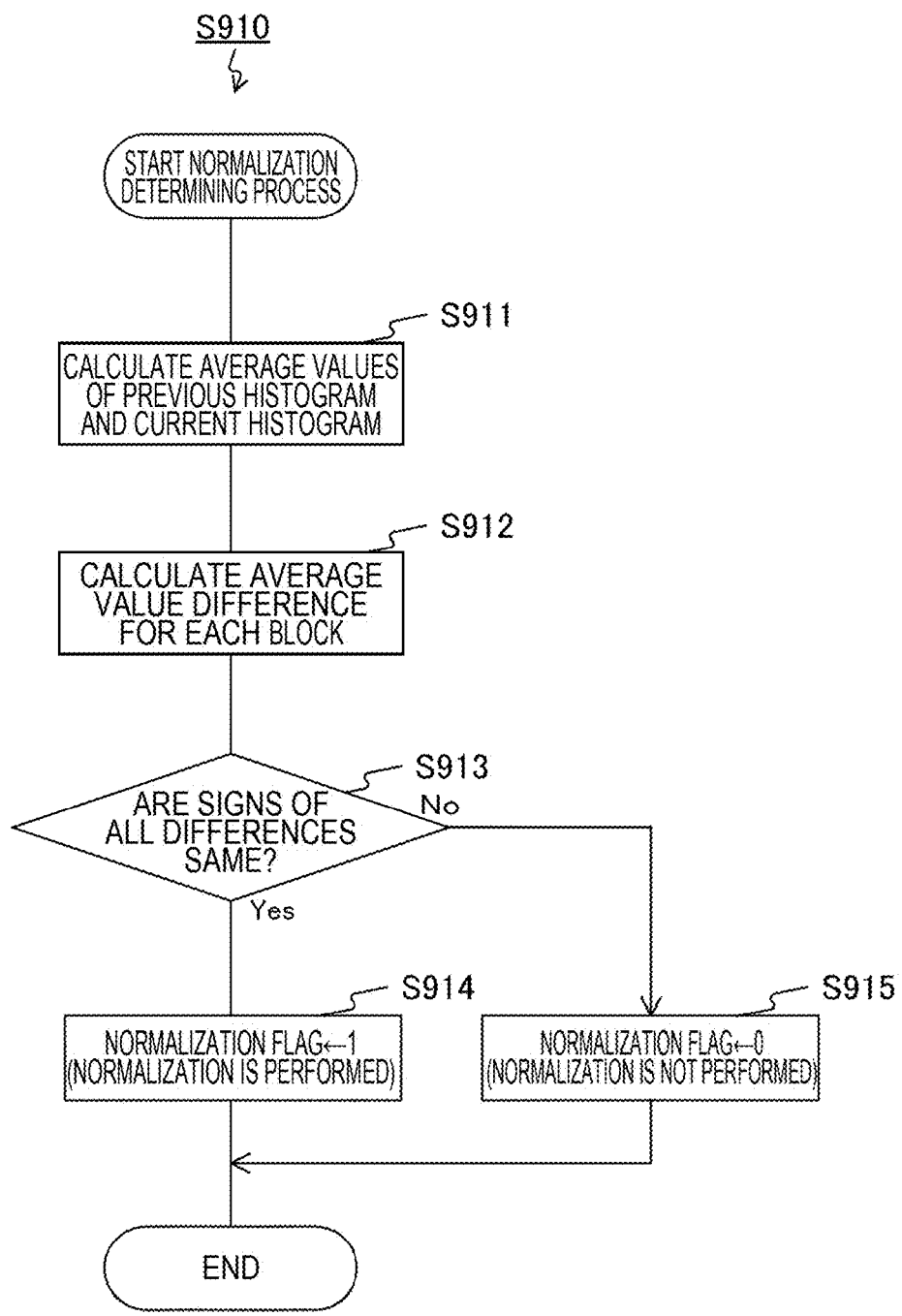
FIG. 28 is a flowchart illustrating an example of a normalization determining process in the fourth embodiment.

FIG. 28 is a flowchart illustrating an example of the normalization determining process in the fourth embodiment. The image processing unit 200 calculates average values of a previous histogram and a current histogram (Step S911), and calculates a difference thereof for each block (Step S912).

Then, the image processing unit 200 decides whether signs of all average value difference are the same (Step S913). When all of the signs are the same (Yes in Step S913), the image processing unit 200 determines that normalization is performed and sets a normalization flag to "0" (Step S914). On the other hand, when any of the signs is different (No in Step S913), the image processing unit 200 determines that no normalization is performed and sets a normalization flag to "1" (Step S915). After Step S914 or S915, the image processing unit 200 ends the normalization determining process.

Figure 29:
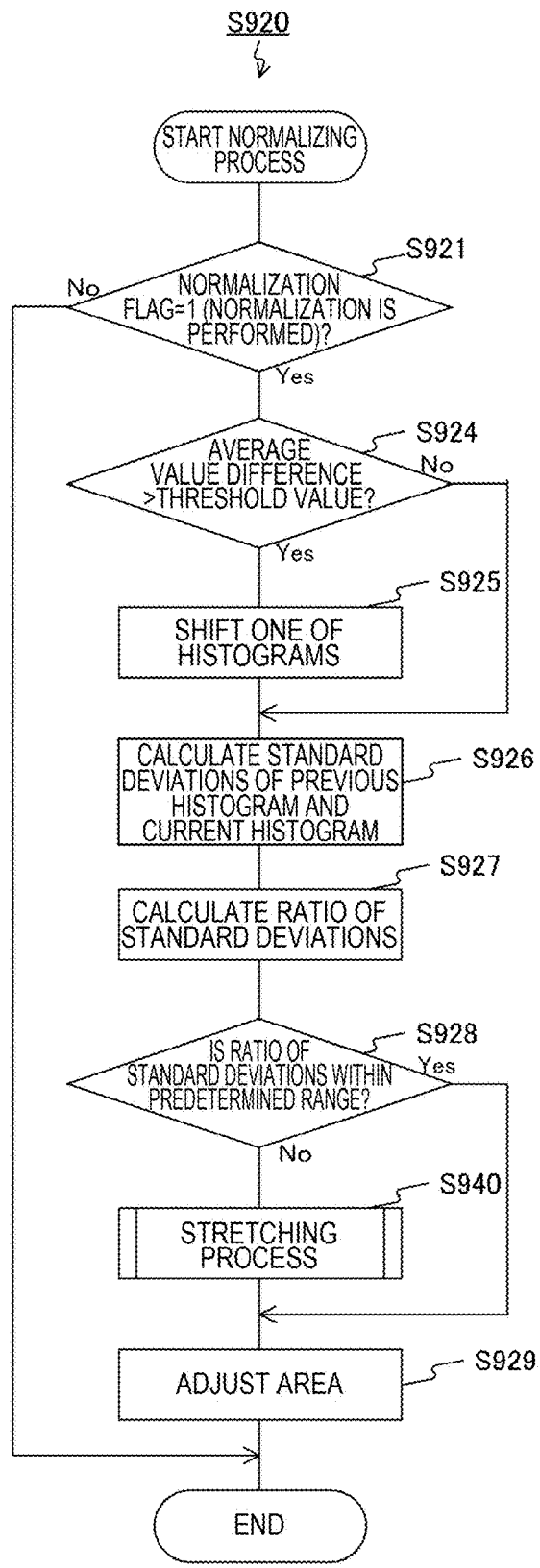
FIG. 29 is a flowchart illustrating an example of a normalizing process in the fourth embodiment.

FIG. 29 is a flowchart illustrating an example of a normalizing process in the fourth embodiment. The normalizing process of the fourth embodiment is different from that of the third embodiment in that Step S922 and S923 are not performed but Step S921 is further performed. The image processing unit 200 decides whether the normalization flag is "1" (that is, whether normalization is performed) (Step S921). When the normalization flag is "1" (Yes in Step S921), the image processing unit 200 performs processes of Step S924 to S929. On the other hand, when the normalization flag is "0" (No in Step S921) or after Step S929, the image processing unit 200 ends the normalizing process.

In this manner, according to the fourth embodiment, the image processing unit 200 determines whether normalization should be performed from the average value difference, and performs normalization only when it is determined that normalization should be performed. Therefore, it is possible to prevent normalization from being unnecessarily performed. Accordingly, it is possible to reduce an amount of computation of the image processing unit 200.

5. Fifth Embodiment

In the third embodiment, the image processing unit 200 determines whether an interruption has occurred from a similarity determination result. Alternatively, a moving image may be compressed at a compression rate according to the similarity determination result. The image processing unit 200 of a fifth embodiment is different from that of the first embodiment in that a moving image is compressed at a compression rate according to a similarity determination result.

Figure 30:
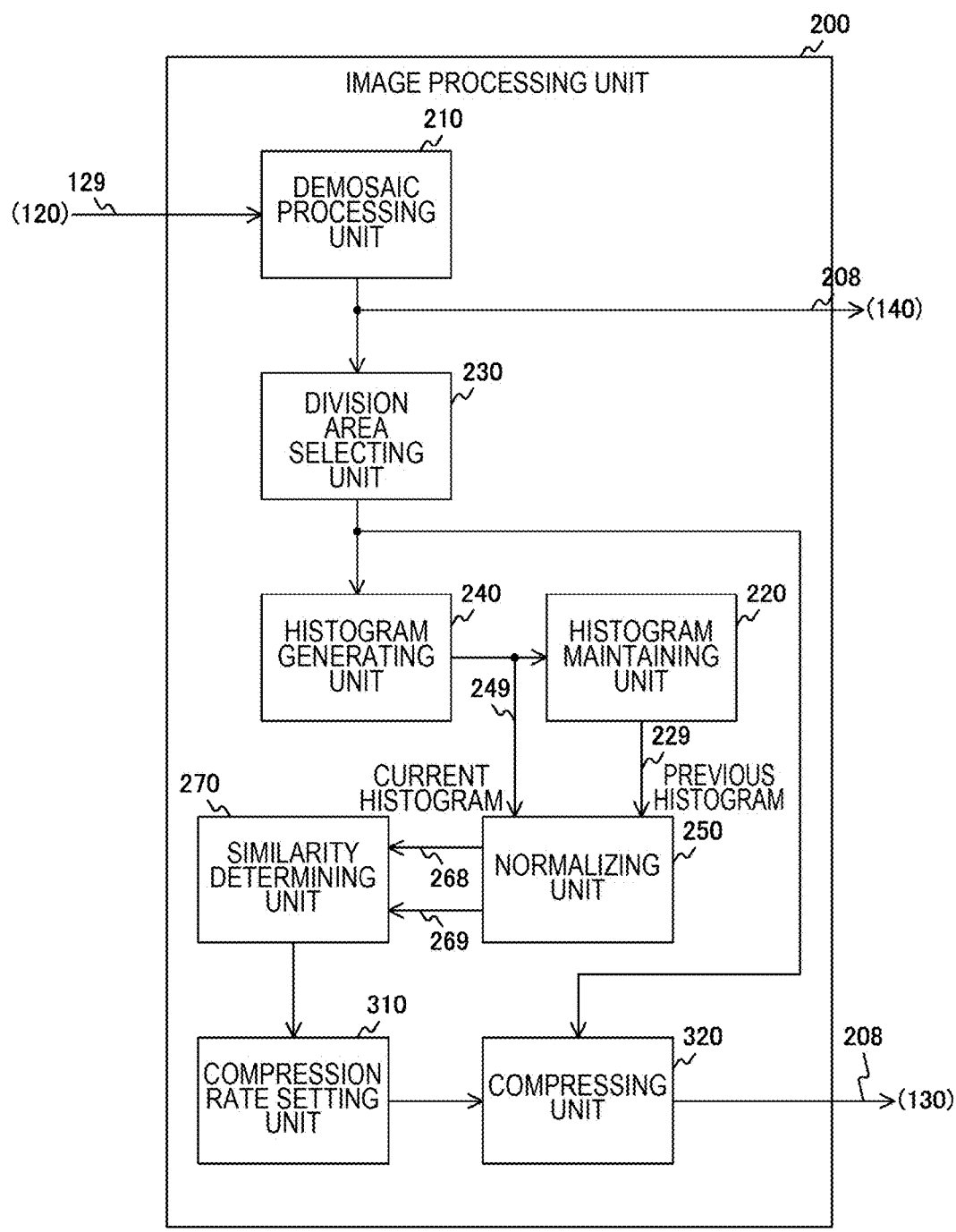
FIG. 30 is a block diagram illustrating a configuration example of an image processing unit in a fifth embodiment.

FIG. 30 is a block diagram illustrating a configuration example of the image processing unit 200 in the fifth embodiment. The image processing unit 200 is different from that of the third embodiment in that the determination result counting unit 280 and the interruption determining unit 290 are not included but a compression rate setting unit 310 and a compressing unit 320 are further included.

The compression rate setting unit 310 sets a compression rate for each block according to the similarity determination result and supplies the compression rate to the compressing unit 320. For example, when a degree of similarity of a block is greater than a similarity determining threshold value, a compression rate C1 is set and otherwise, a compression rate C2 is set.

When a higher value is used as a degree of similarity as similarity increases (in other words, as change decreases), C1 is set to a value that is greater than C2. On the other hand, when a smaller value is used as a degree of similarity as similarity increases (in other words, as change decreases), C1 is set to a value that is smaller than C2.

The compressing unit 320 performs compression for each block according to the set compression rate. The compressing unit 320 performs compression according to standards, for example, Moving Picture Experts Group (MPEG)-2, and supplies the compressed moving image data to the external interface 130.

The image processing unit 200 does not include the determination result counting unit 280 and the interruption determining unit 290. Alternatively, the image processing unit 200 may further include the determination result counting unit 280 and the interruption determining unit 290 and additionally determine whether an interruption has occurred in addition to compression. In this case, the similarity determination result is also supplied to the determination result counting unit 280.

In this manner, according to the fifth embodiment, since compression is performed at a compression rate according to the similarity determination result, it is possible to maintain image quality of moving image data and reduce an amount of data thereof. That is, it is possible to reduce an amount of data transferred to the outside through the external interface 130.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a hard disk, a CD (Compact Disc), an MD (Mini-Disc), and a DVD (Digital Versatile Disk), a memory card, and a Blu-ray disc (registered trademark) can be used.

In addition, the effects described in the present specification are not limiting but are merely examples, and there may be additional effects.

Additionally, the present technology may also be configured as below.

(1)

An image processing device including:

a histogram generating unit configured to generate a previous histogram showing a distribution of pixel values in a previous frame that is generated before a predetermined frame and a current histogram showing a distribution of pixel values in the predetermined frame;

a normalizing unit configured to perform normalization to match variations of the pixel values of the previous histogram and the current histogram; and a similarity determining unit configured to acquire a degree of similarity of shapes of the previous histogram and the current histogram after the normalization and determine whether the degree of similarity is greater than a predetermined similarity determining threshold value.

(2)

The image processing device according to (1), wherein the similarity determining unit includes a similarity degree acquiring unit configured to acquire the degree of similarity from the previous histogram and the current histogram after the normalization, a moment difference calculating unit configured to obtain 3rd- or higher-order moments of the previous histogram and the current histogram after the normalization and calculate a difference between the moments as a moment difference, a similarity determining threshold value setting unit configured to set a value according to the moment difference as the similarity determining threshold value, and a comparing unit configured to compare the acquired degree of similarity with the set similarity determining threshold value and determine whether the degree of similarity is greater than the predetermined similarity determining threshold value.

(3)

The image processing device according to (2), wherein the moment includes skewness.

(4)

The image processing device according to (2) or (3), wherein the moment includes kurtosis.

(5)

The image processing device according to any of (1) to (4), wherein the previous frame and the current frame each include a plurality of blocks, and the histogram generating unit generates a histogram of a predetermined number of blocks among the plurality of blocks within the previous frame as the previous histogram and generates a histogram of the predetermined number of blocks among the plurality of blocks within the predetermined frame as the current histogram.

(6)

The image processing device according to (5), further including:

a normalization determining unit configured to determine whether the normalization is to be performed based on a difference between a statistic of the pixel values of the predetermined number of blocks within the previous frame and a statistic of the pixel values of the predetermined number of blocks within the predetermined frame, wherein the normalizing unit performs the normalization when it is determined that the normalization is to be performed.

(7)

The image processing device according to any of (1) to (6), further including:

an interruption determining unit configured to determine whether any of the number of times that it is determined that the degree of similarity is greater than the predetermined similarity determining threshold value within a constant cycle and the number of times that it is determined that the degree of similarity is not greater than the predetermined similarity determining threshold value within the constant cycle is greater than a predetermined interruption determining threshold value, wherein the similarity determining unit determines whether the degree of similarity is greater than the predetermined similarity determining threshold value a plurality of times within the constant cycle.

(8)

The image processing device according to any of (1) to (7), wherein the normalizing unit performs the normalization by a stretching process in which a width of one of the previous histogram and the current histogram is extended or contracted according to a ratio of degrees of the variation of the previous histogram and the current histogram.

(9)

The image processing device according to any of (1) to (8), wherein the normalizing unit performs normalization to match degrees of the variation and averages of the pixel values of the previous histogram and the current histogram.

(10)

The image processing device according to any of (1) to (9), further including:

a compression rate setting unit configured to set a different compression rate for when it is determined that the degree of similarity is greater than the predetermined similarity determining threshold value and when it is determined that the degree of similarity is not greater than the predetermined similarity determining threshold value; and a compressing unit configured to compress the previous frame and the current frame according to the set compression rate.

(11)

An imaging device including:

an imaging unit configured to sequentially image a plurality of frames;

a histogram generating unit configured to generate a previous histogram showing a distribution of pixel values in a previous frame that is imaged before a predetermined frame among the plurality of frames and a current histogram showing a distribution of pixel values in the predetermined frame;

a normalizing unit configured to perform normalization to match variations of the pixel values of the previous histogram and the current histogram; and a similarity determining unit configured to acquire a degree of similarity of shapes of the previous histogram and the current histogram after the normalization and determine whether the degree of similarity is greater than a predetermined similarity determining threshold value.

(12)

An image processing method including:

a histogram generating procedure of a histogram generating unit generating a previous histogram showing a distribution of pixel values in a previous frame that is generated before a predetermined frame and a current histogram showing a distribution of pixel values in the predetermined frame;

a normalizing procedure of a normalizing unit performing normalization to match variations of the pixel values of the previous histogram and the current histogram; and a similarity determining procedure of a similarity determining unit acquiring a degree of similarity of shapes of the previous histogram and the current histogram after the normalization and determining whether the degree of similarity is greater than a predetermined similarity determining threshold value.

(13)

A program causing a computer to execute:

a histogram generating procedure of a histogram generating unit generating a previous histogram showing a distribution of pixel values in a previous frame that is generated before a predetermined frame and a current histogram showing a distribution of pixel values in the predetermined frame;

a normalizing procedure of a normalizing unit performing normalization to match variations of the pixel values of the previous histogram and the current histogram; and a similarity determining procedure of a similarity determining unit acquiring a degree of similarity of shapes of the previous histogram and the current histogram after the normalization and determining whether the degree of similarity is greater than a predetermined similarity determining threshold value.

REFERENCE SIGNS LIST

100 imaging device
110 imaging lens
120 imaging element
130 external interface
140 control unit 200 image processing unit
210 demosaic processing unit
220 histogram maintaining unit
230 division area selecting unit
240 histogram generating unit
250 normalizing unit
251, 263 previous histogram average value calculating unit
252, 264 current histogram average value calculating unit
253, 265, 275 subtractor
254 histogram shift unit
255 previous histogram standard deviation calculating unit
256 current histogram standard deviation calculating unit
257 standard deviation ratio calculating unit
258 stretching processing unit
259 area adjusting unit
260, 261 switching unit
262 normalization determining unit
266 tendency determining unit
270 similarity determining unit
271 similarity degree calculating unit
272 comparing unit
273 previous histogram skewness calculating unit
274 current histogram skewness calculating unit
276 similarity determining threshold value table
277 similarity determining threshold value setting unit
280 determination result counting unit
290 interruption determining unit
310 compression rate setting unit
320 compressing unit

The invention claimed is:

1. An image processing device comprising:
a computer including a processing device and a memory device containing instructions that, when executed by the processing device, are configured to:
generate a previous histogram showing a distribution of pixel values in a previous frame that is generated before a predetermined frame and a current histogram showing a distribution of pixel values in the predetermined frame;
perform normalization to match variations of the pixel values of the previous histogram and the current histogram;
acquire a degree of similarity of shapes of the previous histogram and the current histogram after the normalization and determine whether the degree of similarity is greater than a predetermined similarity determining threshold value; and
output an interruption determination result for generating an alarm signal indicative of an interruption when the degree of similarity is less than the predetermined similarity determining threshold value.

2. The image processing device according to claim 1, wherein the instructions are configured to
acquire the degree of similarity from the previous histogram and the current histogram after the normalization,
obtain 3rd- or higher-order moments of the previous histogram and the current histogram after the normalization and calculate a difference between the moments as a moment difference,
set a value according to the moment difference as the similarity determining threshold value, and
compare the acquired degree of similarity with the set similarity determining threshold value and determine whether the degree of similarity is greater than the predetermined similarity determining threshold value.

3. The image processing device according to claim 2, wherein the moment includes skewness.

4. The image processing device according to claim 2, wherein the moment includes kurtosis.

5. The image processing device according to claim 1,
wherein the previous frame and the current frame each include a plurality of blocks, and
the instructions are configured to generate a histogram of a predetermined number of blocks among the plurality of blocks within the previous frame as the previous histogram and to generate a histogram of the predetermined number of blocks among the plurality of blocks within the predetermined frame as the current histogram.

6. The image processing device according to claim 5, wherein the instructions are further configured to:
determine whether the normalization is to be performed based on a difference between a statistic of the pixel values of the predetermined number of blocks within the previous frame and a statistic of the pixel values of the predetermined number of blocks within the predetermined frame,
wherein the instructions are configured to perform the normalization when it is determined that the normalization is to be performed.

7. The image processing device according to claim 1, wherein the instructions are further configured to:
determine whether any of the number of times that it is determined that the degree of similarity is greater than the predetermined similarity determining threshold value within a constant cycle and the number of times that it is determined that the degree of similarity is not greater than the predetermined similarity determining threshold value within the constant cycle is greater than a predetermined interruption determining threshold value,
wherein the instructions are configured to determine whether the degree of similarity is greater than the predetermined similarity determining threshold value a plurality of times within the constant cycle.

8. The image processing device according to claim 1,
wherein the instructions are configured to perform the normalization by a stretching process in which a width of one of the previous histogram and the current histogram is extended or contracted according to a ratio of degrees of the variation of the previous histogram and the current histogram.

9. The image processing device according to claim 1,
wherein the instructions are configured to perform normalization to match degrees of the variation and averages of the pixel values of the previous histogram and the current histogram.

10. The image processing device according to claim 1, wherein the instructions are further configured to:
set a different compression rate for when it is determined that the degree of similarity is greater than the predetermined similarity determining threshold value and when it is determined that the degree of similarity is not greater than the predetermined similarity determining threshold value; and
compress the previous frame and the current frame according to the set compression rate.

11. An imaging device comprising:
an imaging camera configured to sequentially image a plurality of frames; and
an image processing device including a processing device and a memory device containing instructions that, when executed by the processing device, are configured to:

generate a previous histogram showing a distribution of pixel values in a previous frame that is imaged before a predetermined frame among the plurality of frames and a current histogram showing a distribution of pixel values in the predetermined frame;

perform normalization to match variations of the pixel values of the previous histogram and the current histogram;

acquire a degree of similarity of shapes of the previous histogram and the current histogram after the normalization and determine whether the degree of similarity is greater than a predetermined similarity determining threshold value; and output an interruption determination result for generating an alarm signal indicative of an interruption when the degree of similarity is less than the predetermined similarity determining threshold value.

12. An image processing method performed by a computer, the method comprising:

generating a previous histogram showing a distribution of pixel values in a previous frame that is generated before a predetermined frame and a current histogram showing a distribution of pixel values in the predetermined frame;

performing normalization to match variations of the pixel values of the previous histogram and the current histogram;

acquiring a degree of similarity of shapes of the previous histogram and the current histogram after the normalization and determining whether the degree of similarity is greater than a predetermined similarity determining threshold value; and outputting an interruption determination result for generating an alarm signal indicative of an interruption when the degree of similarity is less than the predetermined similarity determining threshold value.

13. A non-transitory computer-readable medium containing instructions that, when executed by a processing device, perform a method comprising:

generating a previous histogram showing a distribution of pixel values in a previous frame that is generated before a predetermined frame and a current histogram showing a distribution of pixel values in the predetermined frame;

performing normalization to match variations of the pixel values of the previous histogram and the current histogram;

acquiring a degree of similarity of shapes of the previous histogram and the current histogram after the normalization and determining whether the degree of similarity is greater than a predetermined similarity determining threshold value; and outputting an interruption determination result for generating an alarm signal indicative of an interruption when the degree of similarity is less than the predetermined similarity determining threshold value.

* * * * *